United States Patent
Cui et al.

(10) Patent No.: US 12,126,482 B2
(45) Date of Patent: Oct. 22, 2024

(54) SIGNAL PROCESSING APPARATUS AND SIGNAL PROCESSING METHOD

(71) Applicant: ZTE CORPORATION, Guangdong (CN)

(72) Inventors: Xingxing Cui, Guangdong (CN); Ying Deng, Guangdong (CN); Zuofeng Zhang, Guangdong (CN); Yenan Bie, Guangdong (CN); Tian Tian, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 4 days.

(21) Appl. No.: 18/031,575

(22) PCT Filed: Jul. 19, 2021

(86) PCT No.: PCT/CN2021/107048
§ 371 (c)(1),
(2) Date: Apr. 12, 2023

(87) PCT Pub. No.: WO2022/077985
PCT Pub. Date: Apr. 21, 2022

(65) Prior Publication Data
US 2023/0388173 A1 Nov. 30, 2023

(30) Foreign Application Priority Data
Oct. 13, 2020 (CN) .......................... 202011091511.0

(51) Int. Cl.
*H04L 27/34* (2006.01)
*H04B 7/0456* (2017.01)

(52) U.S. Cl.
CPC ....... *H04L 27/3405* (2013.01); *H04B 7/0456* (2013.01)

(58) Field of Classification Search
CPC ..... H04L 27/32; H04L 27/34; H04L 27/3405; H04L 27/3411; H04L 27/3422;
(Continued)

(56) References Cited

U.S. PATENT DOCUMENTS 8,358,711 B2 * 1/2013 Marsili ............. H04L 25/03834
370/335
8,767,661 B2 * 7/2014 Han ........................ H04L 5/001
370/329

(Continued)

*Primary Examiner* — James M Perez
(74) *Attorney, Agent, or Firm* — Li & Cai Intellectual Property (USA) Office

(57) ABSTRACT

The present disclosure provides a signal processing apparatus and a signal processing method, the signal processing apparatus includes: a preprocessing unit configured to generate a joint matrix according to channel matrixes of subcarriers, and perform a parallel-to-serial conversion on QAM signals of the subcarriers to obtain a serial QAM signal; a judgment unit configured to determine a constraint relationship of a constellation point in each element according to a determining result obtained by determining that whether the constellation point is to be extended in a constellation diagram; a processing unit configured to establish a convex optimization model according to the joint matrix, the serial QAM signal and the determining result, and determine a joint time-domain signal of antenna channels according to the constraint relationship of the constellation point and the convex optimization model; and a conversion unit configured to perform a serial-to-parallel conversion on the joint time-domain signal.

14 Claims, 10 Drawing Sheets

(58) Field of Classification Search
CPC ............ H04L 27/3427; H04L 27/3433; H04L 27/3438; H04L 27/34444; H04B 7/04; H04B 7/0413; H04B 7/0456; H04B 7/046; H04B 7/0465; H04B 7/0469; H04B 17/30; H04B 17/391; H04B 17/3912; H04B 2201/69; H04B 2201/707; H04B 2201/70706
See application file for complete search history.

(56) References Cited

U.S. PATENT DOCUMENTS

| | | | | |
|---|---|---|---|---|
| 8,867,496 | B2 * | 10/2014 | Han | H04L 5/0057 370/335 |
| 8,995,384 | B2 * | 3/2015 | Han | H04J 11/0069 370/329 |
| 9,155,087 | B2 * | 10/2015 | Han | H04L 5/0026 |
| 9,591,656 | B2 * | 3/2017 | Huang | H04B 17/24 |
| 9,780,985 | B1 * | 10/2017 | Tom | H04L 5/0007 |
| 9,876,657 | B1 * | 1/2018 | Jeon | H04B 7/0452 |
| 9,948,442 | B2 * | 4/2018 | Han | H04J 11/005 |
| 10,264,525 | B2 * | 4/2019 | Pratt | H04W 40/16 |
| 10,516,452 | B1 * | 12/2019 | Pekoz | H04L 25/0204 |
| 10,644,771 | B2 * | 5/2020 | Pekoz | H04B 7/046 |
| 10,721,045 | B2 * | 7/2020 | Han | H04J 13/004 |
| 10,887,723 | B2 * | 1/2021 | Sanderovich | G01S 5/0247 |
| RE48,741 | E * | 9/2021 | Han | H04L 27/2636 |
| 11,115,095 | B1 * | 9/2021 | Castañeda | H04L 25/0202 |
| 11,146,445 | B2 * | 10/2021 | Qingsong | H04L 41/064 |
| 11,303,310 | B2 * | 4/2022 | Meilhac | H03F 1/3294 |
| 11,349,539 | B2 * | 5/2022 | Orhan | H04B 7/0456 |
| RE49,263 | E * | 10/2022 | Han | H04W 72/02 |
| 11,742,889 | B2 * | 8/2023 | Laporte | H04B 1/123 455/552.1 |
| 11,949,543 | B1 * | 4/2024 | Sayed Hassan | H04L 27/2078 |
| 11,979,216 | B2 * | 5/2024 | Du | H04B 7/0697 |
| 2011/0051783 | A1 * | 3/2011 | Cahn | H04L 23/02 375/302 |
| 2012/0300726 | A1 * | 11/2012 | Han | H04L 5/0053 370/329 |
| 2012/0320880 | A1 * | 12/2012 | Han | H04L 5/0053 370/335 |
| 2013/0101009 | A1 * | 4/2013 | Huang | H04B 7/0413 375/232 |
| 2013/0177097 | A1 * | 7/2013 | Li | H04B 7/0456 375/267 |
| 2013/0182791 | A1 * | 7/2013 | Dhakal | H04B 7/0456 375/295 |
| 2014/0045510 | A1 * | 2/2014 | Yue | H04B 7/0632 455/450 |
| 2014/0140360 | A1 * | 5/2014 | Nikopour | H04L 27/362 370/479 |
| 2014/0286259 | A1 * | 9/2014 | Han | H04L 5/0094 370/329 |
| 2015/0049718 | A1 * | 2/2015 | Han | H04J 13/0062 370/329 |
| 2015/0173068 | A1 * | 6/2015 | Han | H04L 5/0094 370/329 |
| 2015/0296524 | A1 * | 10/2015 | Huang | H04B 17/336 370/329 |
| 2016/0050099 | A1 * | 2/2016 | Siohan | H04L 27/3411 375/295 |
| 2016/0219506 | A1 * | 7/2016 | Pratt | H04W 40/16 |
| 2018/0139081 | A1 * | 5/2018 | Guvenkaya | H04L 25/03828 |
| 2018/0191477 | A1 * | 7/2018 | Han | H04J 11/005 |
| 2018/0331731 | A1 * | 11/2018 | Boudreau | H04B 7/0456 |
| 2019/0200164 | A1 * | 6/2019 | Sanderovich | G01S 5/0247 |
| 2019/0238379 | A1 * | 8/2019 | Walk | H04L 27/2627 |
| 2019/0349224 | A1 * | 11/2019 | Chiskis | H04B 3/32 |
| 2019/0379430 | A1 * | 12/2019 | Pekoz | H04B 7/0478 |
| 2020/0014438 | A1 * | 1/2020 | Alodeh | H04L 25/03343 |
| 2020/0052945 | A1 * | 2/2020 | Kant | H04L 27/2623 |
| 2020/0106495 | A1 * | 4/2020 | Pekoz | H04B 7/0417 |
| 2020/0153570 | A1 * | 5/2020 | Peng | H04L 5/006 |
| 2020/0204421 | A1 * | 6/2020 | Levinbook | H04L 27/2607 |
| 2020/0267040 | A1 * | 8/2020 | Nguyen | H04L 27/2602 |
| 2021/0099207 | A1 * | 4/2021 | Mao | H04L 25/03891 |
| 2021/0168019 | A1 * | 6/2021 | Qingsong | H04L 41/064 |
| 2021/0242915 | A1 * | 8/2021 | Orhan | H04B 7/0608 |
| 2021/0281302 | A1 * | 9/2021 | Castañeda Fernandez | H04B 7/0452 |
| 2021/0399932 | A1 * | 12/2021 | Laporte | H04B 7/0456 |
| 2022/0060364 | A1 * | 2/2022 | Fehri | H04B 7/0617 |
| 2022/0149904 | A1 * | 5/2022 | Timo | H04L 25/4927 |
| 2022/0182115 | A1 * | 6/2022 | Choi | H04B 7/0639 |
| 2022/0190887 | A1 * | 6/2022 | Wang | H04L 27/2614 |
| 2022/0224464 | A1 * | 7/2022 | Rakib | H04L 5/0037 |
| 2022/0321181 | A1 * | 10/2022 | Hadani | H04B 7/024 |
| 2022/0393731 | A1 * | 12/2022 | Wang | H04B 7/0456 |
| 2023/0026867 | A1 * | 1/2023 | Gonzalez Gonzalez | H04W 28/0284 |
| 2023/0035416 | A1 * | 2/2023 | Du | H04B 7/0456 |
| 2023/0106464 | A1 * | 4/2023 | Fozooni | H04B 7/0465 375/259 |
| 2023/0223996 | A1 * | 7/2023 | Mukherjee | H04B 1/662 375/262 |
| 2023/0275605 | A1 * | 8/2023 | Zhang | H04B 7/0417 375/297 |
| 2023/0284154 | A1 * | 9/2023 | Wang | H04W 52/346 455/522 |
| 2023/0291613 | A1 * | 9/2023 | Gao | H04L 5/0051 |
| 2023/0388173 | A1 * | 11/2023 | Cui | H04B 7/0617 |
| 2024/0106498 | A1 * | 3/2024 | Rekaya Ben-Othman | H04B 7/0456 |

* cited by examiner

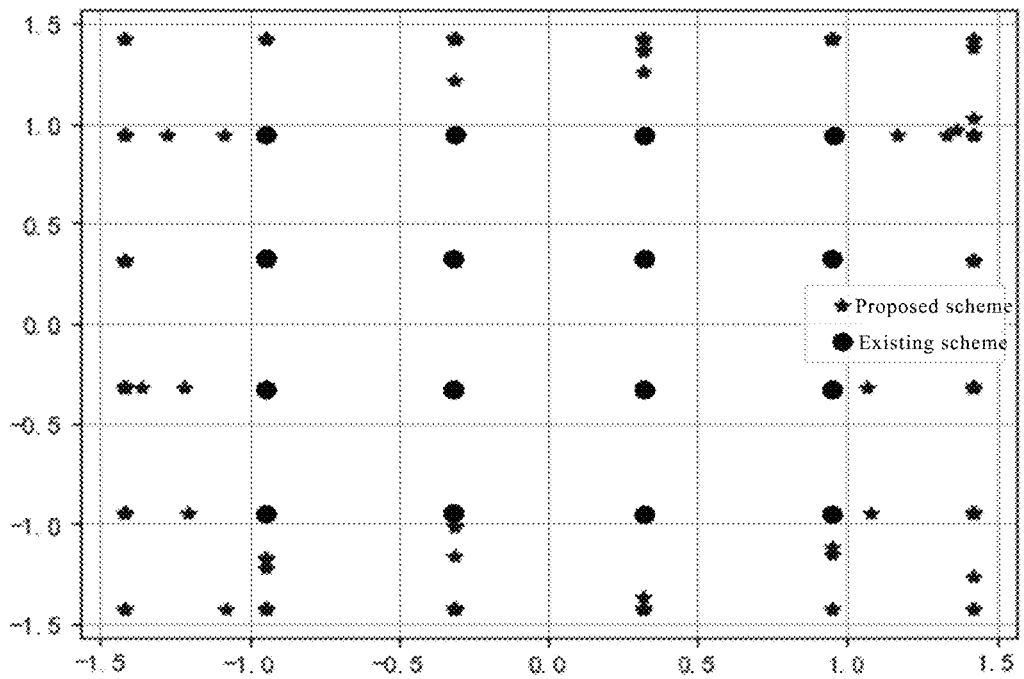

FIG. 8

Generate a joint matrix according to channel matrixes of subcarriers, and perform a parallel-to-serial conversion on QAM signals of the subcarriers to obtain a serial QAM signal including a first sub-signal corresponding to each subcarrier — S11

Determine a constraint relationship of a constellation point in each element according to a determining result obtained by determining that whether the constellation point in each element of the first sub-signal is to be extended in a constellation diagram — S12

Establish a convex optimization model according to the joint matrix, the serial QAM signal and the determining result for the constellation point in each element — S13

Determine a joint time-domain signal of antenna channels according to the constraint relationship of the constellation point in the each element and the convex optimization model — S14

Perform a serial-to-parallel conversion on the joint time-domain signal to obtain a time-domain signal corresponding to each antenna channel — S15

FIG. 9

SIGNAL PROCESSING APPARATUS AND SIGNAL PROCESSING METHOD

CROSS-REFERENCE TO RELATED APPLICATIONS

The present application claims the priority of Chinese Patent Application No. 202011091511.0, filed on Oct. 13, 2020, the contents of which are incorporated herein in their entirety by reference.

TECHNICAL FIELD

The present disclosure relates to the field of communication and digital signal processing technologies, and in particular, to a signal processing apparatus and a signal processing method.

BACKGROUND

In modern mobile communication systems, multi-carrier transmission techniques and high-order digital modulation schemes result in a higher Peak-Average Power Ratio (PAPR) and a larger signal transmission bandwidth of the systems. As the bandwidth increases, the PAPR also continuously increases, which may seriously reduce an average power of a transmitted signal, and thus lower efficiency of a power amplifier (PA). In a new generation wireless communication system, an effect caused by a reduction of the efficiency of the PA is more significant.

In order to solve the above problem, at present, an FITRA algorithm is adopted and an optimal precoding matrix is searched by utilizing a high free degree of precoding brought by massive MIMO, so that the optimal precoding matrix minimizes the PAPR of a time-domain signal during eliminating Multi-User Interferences (MUIs). Because there is no damage to an original signal, EVM (Error Vector Magnitude) performance of the algorithm is good, and the EVM is generally not deteriorated. However, the above scheme is greatly affected by the free degree, and in a case where a number of transmit antennas is relatively small, for example, with a conventional MIMO (Multiple-In Multiple-Out), the number of the transmit antennas/a number of receive antennas is less than two, the free degree of precoding is relatively low, the precoding matrix capable of reducing the PAPR is difficult to be searched, resulting in poor PAPR performance, and thus the above scheme cannot be applied to a conventional MIMO scenario, and is only applied to a massive MIMO scenario, i.e., a case where the number of the transmit antennas/the number of the receive antennas is greater than two.

At present, there is further provided an algorithm for adding a disturbing signal, in which, through the high free degree of a null space brought by the massive MIMO, a signal closest to noise is searched in the null space to be offset with an original signal, so that a noise signal, after being transmitted by a channel, is automatically offset with the channel, and an effect of the EVM at a receiving terminal is eliminated. This scheme is also easily affected by the number of the transmit antennas, applies to limited application scenarios, and cannot be applied to the conventional MIMO scenario.

Therefore, although the PAPR can be reduced by the above schemes, the above schemes are sensitive to the number of the transmit antennas, and can only be used in the massive MIMO scenario, but cannot be applied to the conventional MIMO scenario with a relatively small number of transmit antennas, generality of the schemes is not strong.

SUMMARY

In a first aspect, the present disclosure provides a signal processing apparatus, including: a preprocessing unit, a judgment unit, a processing unit and a conversion unit; the preprocessing unit is configured to generate a joint matrix according to channel matrixes of subcarriers, and perform a parallel-to-serial conversion on QAM signals of the subcarriers to obtain a serial QAM signal including a first sub-signal corresponding to each subcarrier; the judgment unit is configured to, according to a determining result obtained by determining that whether a constellation point in each element of the first sub-signal is to be extended in a constellation diagram, determine a constraint relationship of the constellation point in the element; the processing unit is configured to establish a convex optimization model according to the joint matrix, the serial QAM signal and the determining result for the constellation point in each element, and determine a joint time-domain signal of antenna channels according to the constraint relationship of the constellation point in each element and the convex optimization model; and the conversion unit is configured to perform a serial-to-parallel conversion on the joint time-domain signal to obtain a time-domain signal corresponding to each antenna channel.

In a second aspect, the present disclosure provides a signal processing method, including: generating a joint matrix according to channel matrixes of subcarriers, and performing a parallel-to-serial conversion on QAM signals of the subcarriers to obtain a serial QAM signal including a first sub-signal corresponding to each subcarrier; determining, according to a determining result obtained by determining that whether a constellation point in each element of the first sub-signal is to be extended in a constellation diagram, a constraint relationship of the constellation point in the element; establishing a convex optimization model according to the joint matrix, the serial QAM signal and the determining result for the constellation point in each element; determining a joint time-domain signal of antenna channels according to the constraint relationship of the constellation point in each element and the convex optimization model; and performing a serial-to-parallel conversion on the joint time-domain signal to obtain a time-domain signal corresponding to each antenna channel.

BRIEF DESCRIPTION OF DRAWINGS

FIG. 8 is a schematic diagram illustrating a constellation diagram of a scheme of constellation diagram extension according to the present disclosure compared with a constellation diagram of the existing scheme under 4×4 MIMO;

FIG. 9 is a schematic diagram of a signal processing method according to the present disclosure;

DETAIL DESCRIPTION OF EMBODIMENTS

Exemplary implementations are described in detail below with reference to the accompanying drawings, but may be implemented in different forms, and should not be construed as a limitation. The purpose of providing these implementations is to make the present disclosure more thorough and complete, and to enable those skilled in the art to fully understand the scope of the present disclosure.

As used herein, a term "and/or" includes any and all combinations of one or more of listed items.

The terms used in the present disclosure are for a purpose of describing particular implementations only, but are not intended to limit the present disclosure. As used in the present disclosure, singular forms "a" and "the" are intended to include plural forms as well, i.e., to represent at least one, unless the context clearly defines otherwise. It should further be understood that terms "includes/comprises" and/or "made of/formed of" in the present disclosure are used to specify a presence of at least one of recited features, integers, steps, operations, elements or components, but do not preclude a presence or an addition of at least one of other features, integers, steps, operations, elements, components or groups thereof.

Implementations of the present disclosure may be described with reference to plan and/or cross-sectional views with the help of idealized schematic illustrations of the present disclosure. Therefore, the example illustrations may be modified in accordance with manufacturing techniques and/or tolerances. Implementations of the present disclosure are not limited to those shown in the accompanying drawings, but include modifications of any configuration formed based on a manufacturing process. Therefore, areas illustrated in the accompanying drawings are provided with schematic properties, and shapes of the areas illustrated in the accompanying drawings illustrate specific shapes of the areas of elements, but are not limiting.

Unless otherwise defined, meanings of all terms (including technical terms and scientific terms) used herein are the same as meanings commonly understood by one of ordinary skill in the art. It should further be understood that terms, such as those defined in common dictionaries, should be construed as having a meaning that is consistent with that in background of the existing art and the present disclosure, and should not be construed as having an idealized or over-formal meaning, unless expressly defined in the present disclosure.

Figure 1:
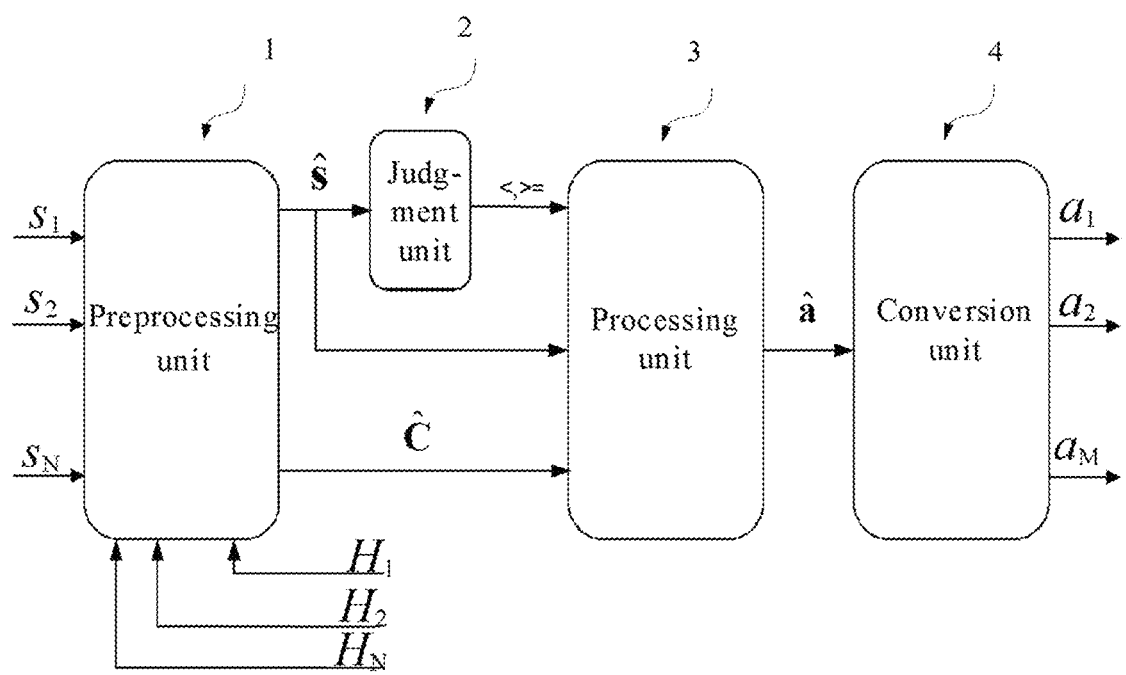
FIG. 1 is a schematic structural diagram of a signal processing apparatus according to the present disclosure.
Figure 3:
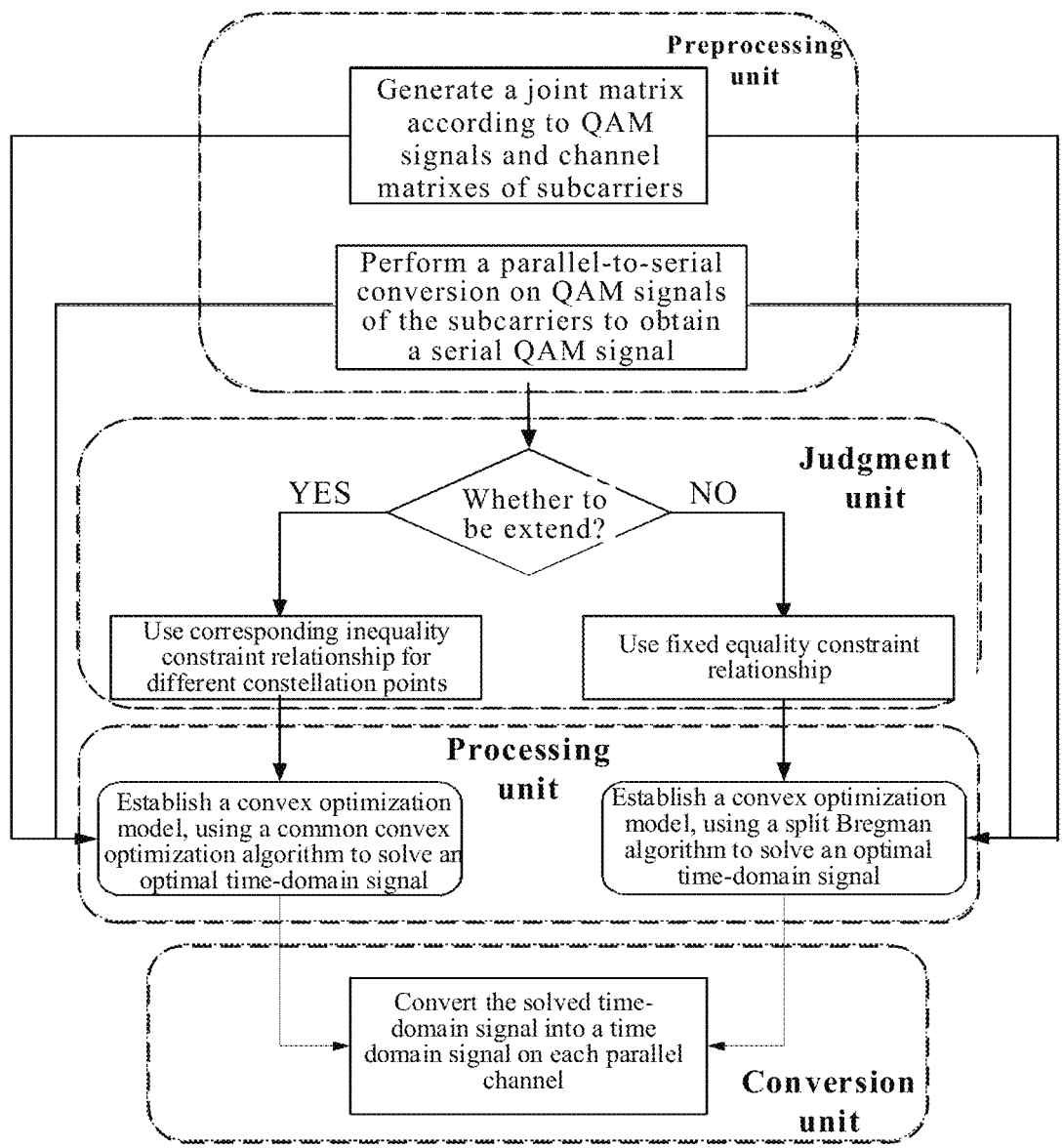
FIG. 3 is a schematic diagram of an operating process of a signal processing apparatus according to the present disclosure.

The present disclosure provides a signal processing apparatus, as shown in FIG. 1 and FIG. 3, the signal processing apparatus includes a preprocessing unit 1, a judgment unit 2, a processing unit 3 and a conversion unit 4. The preprocessing unit 1 is configured to generate a joint matrix according to channel matrixes of subcarriers, and perform a parallel-to-serial conversion on QAM signals of the subcarriers to obtain a serial QAM signal including a first sub-signal corresponding to each subcarrier. The judgment unit 2 is configured to determine, according to a determining result obtained by determining that whether a constellation point in each element of the first sub-signal is to be extended in a constellation diagram, a constraint relationship of the constellation point in the element. The processing unit 3 is configured to establish a convex optimization model according to the joint matrix, the serial QAM signal and the determining result for the constellation point in each element; and determine a joint time-domain signal of antenna channels according to the constraint relationship of the constellation point in each element and the convex optimization model. The conversion unit 4 is configured to perform a serial-to-parallel conversion on the joint time-domain signal to obtain a time-domain signal corresponding to each antenna channel.

In the signal processing apparatus provided in the present disclosure, the preprocessing unit is configured to generate a joint matrix according to channel matrixes of subcarriers, and perform a parallel-to-serial conversion on QAM signals of the subcarriers to obtain a serial QAM signal including a first sub-signal corresponding to each subcarrier; the judgment unit is configured to determine, according to a determining result obtained by determining that whether a constellation point in each element of the first sub-signal is to be extended in a constellation diagram, a constraint relationship of the constellation point in the element; the processing unit is configured to establish a convex optimization model according to the joint matrix, the serial QAM signal and the determining result for the constellation point in each element, and determine a joint time-domain signal of antenna channels according to the constraint relationship of the constellation point in each element and the convex optimization model; and the conversion unit is configured to perform a serial-to-parallel conversion on the joint time-domain signal to obtain a time-domain signal corresponding to each antenna channel. According to the present disclosure, whether the constellation point in each element of the first sub-signal is to be extended in the constellation diagram is determined, and the constraint relationship of the constellation point in each element is determined according to the determining result, and in response to that the constellation point in the element is to be extended, on one hand, a free degree of precoding and a free degree of the constellation diagram in MIMO can be simultaneously utilized to reduce the PAPR, so that a greater free degree is brought, the signal processing apparatus provided in the present disclosure can be applied to more scenarios including massive MIMO scenarios and conventional MIMO scenarios, and generality of usage of the signal processing apparatus is improved; on the other hand, a direction of extension is controllable, performance of demodulating a signal at a receiving terminal cannot be affected, so that an accuracy of determining for the constellation point can be ensured by using a hard decision mode; in the present disclosure, a joint processing of crest factor reduction, precoding and IDFT can be implemented, and on a basis of reducing the PAPR of the signal, the EVM cannot be deteriorated, a subsequent operation of crest factor reduction can be omitted, resulting in a simplified signal processing process.

Figure 2A:
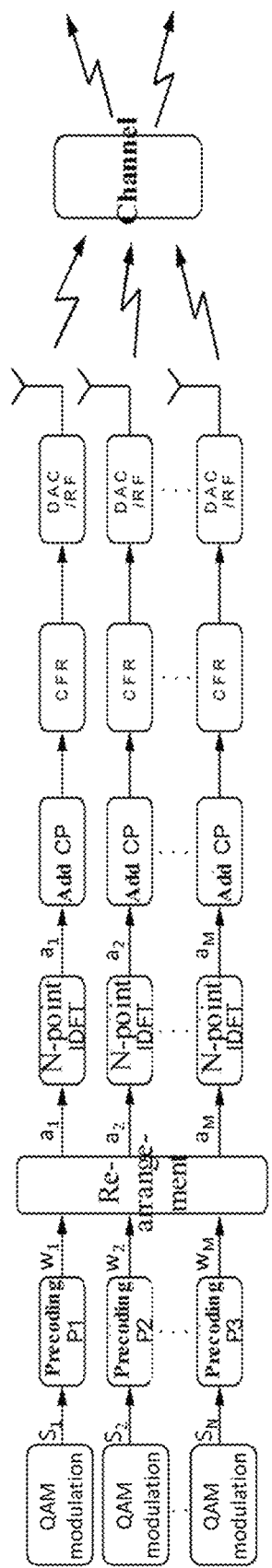
FIG. 2a is a schematic diagram of a MIMO transmitter in the existing art.
Figure 2B:
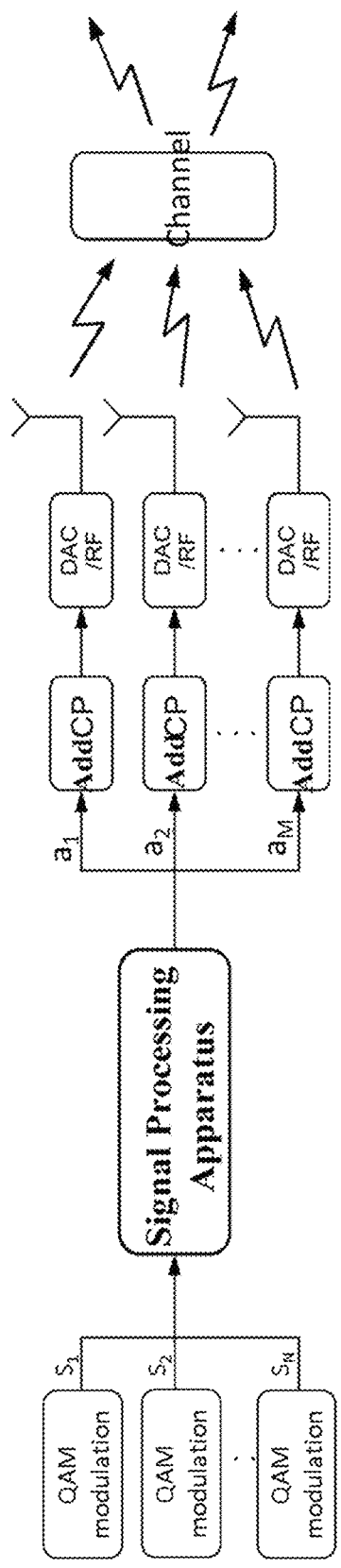
FIG. 2b is a schematic diagram of a signal processing apparatus according to the present disclosure in a MIMO transmitter.

As shown in FIG. 2a, in a MIMO transmitter in the existing art, after being subjected to QAM modulation processing, a signal is sequentially subjected to precoding processing, rearrangement processing, and IDFT processing, and then subjected to Cyclic Prefix (CP) adding processing, crest factor reduction (CFR) processing, and digital-to-analog conversion/radio frequency circuit (DAC/RF), and is transmitted out to enter a channel. A position of the signal processing apparatus provided in the present disclosure in the MIMO transmitter is shown in FIG. 2b, the signal processing apparatus is located following a QAM modulation device and prior to a CP adding device, i.e., the signal processing provided in the present disclosure is operated after the QAM modulation processing and before adding the CP. As can be seen by comparing FIG. 2a with FIG. 2b, the signal processing apparatus provided in the present disclosure integrates precoding, rearrangement processing, IDFT processing, and CFR processing, implements a CFR-precoding-IDFT joint processing, and simplifies existing signal processing operations and a plurality of functions of the signal processing apparatus.

As shown in FIG. 1 and FIG. 3, the preprocessing unit 1 has following two functions (1) and (2).

In function (1), a parallel-to-serial conversion is performed on QAM signals ($s_1, s_2, \ldots, s_N$) of subcarriers output by a QAM modulation unit, the QAM signals of all subcarriers are converted into a serial signal $\hat{s}$ as an output, $s_1$, $s_2, \ldots, s_N$ are first sub-signals corresponding to the subcarriers respectively, each of the first sub-signals includes a plurality of elements, and each element includes a constellation point.

In function (2), a joint matrix is generated according to channel matrixes of the subcarriers, which specifically includes following operations (a) to (d).

At operation (a), a block diagonalization matrix $\hat{H}$ is constructed by using a channel matrix $H_n$ ($H_n \in C^{K \times M}$, n=1, ..., N) of all subcarriers:

$$\hat{H} = \begin{bmatrix} H_1 & 0 & 0 & 0 \\ 0 & H_2 & 0 & 0 \\ 0 & 0 & \ddots & 0 \\ 0 & 0 & 0 & H_N \end{bmatrix}, \hat{H} \in C^{KN \times MN},$$

M is a number of antenna channels (i.e., a number of transmit antennas), K is a number of single-antenna users, N is a number of the subcarriers, and the channel matrix $H_n$ is input from outside and may be updated according to a channel updating frequency of an antenna system.

At operation (b), a block diagonalization matrix $\hat{D}$ is constructed by using an IDFT (inverse discrete Fourier transform) matrix $D \in C^{N \times N}$:

$$\hat{D} = \begin{bmatrix} D & 0 & 0 & 0 \\ 0 & D & 0 & 0 \\ 0 & 0 & \ddots & 0 \\ 0 & 0 & 0 & D \end{bmatrix}, \hat{D} \in C^{NN \times NN}.$$

At operation (c), a transposed matrix $T \in C^{NN \times NN}$ is constructed, the transposed matrix meets following conditions: $\hat{D}^T = T\hat{D}$, $\hat{D}^T$ is a transposed matrix of $\hat{D}$.

At operation (d), the diagonal matrix $\hat{H}$ of the channel matrix, the block diagonalization matrix $\hat{D}$ and the transposed matrix T are multiplied, to calculate and generate a joint matrix $\hat{C}$: $\hat{C} = \hat{H}T\hat{D}$, $\hat{C} \in C^{KN \times 1}$.

In some implementations, the constraint relationship includes a constraint relationship of a real part and a constraint relationship of an imaginary part. The judgment unit 2 is configured to, in response to that the constellation point in the element of the first sub-signal is determined to be extended in the constellation diagram, determine the constraint relationship of the real part and the constraint relationship of the imaginary part of the constellation point in the element according to a position of the constellation point in the element in the constellation diagram, the constraint relationship of the real part and the constraint relationship of the imaginary part include a greater-than relationship, a smaller-than relationship, or an equal-to relationship.

In some implementations, the judgment unit 2 is further configured to, in response to that the constellation point in the element of the first sub-signal is determined to be not extended in the constellation diagram, determine that each of the constraint relationship of the real part and the constraint relationship of the imaginary part of the constellation point in the element is the equal-to relationship. That is, the judgment unit 2 uses the serial QAM signal $\hat{s}$ of the preprocessing unit 1 as an input signal to determine whether the constellation point in each element of each of the first sub-signals ($s_1, s_2, \ldots, s_N$) in the serial QAM signal $\hat{s}$ is to be extended in the constellation diagram, and thereby determines an application scenario of the signal processing apparatus. In a case where the constellation point in the element is to be extended in the constellation diagram, a real part and an imaginary part of the constellation point in the element are set to be in an inequality relationship, i.e., a relationship of the real part/imaginary part of the constellation point in the element is a greater-than relationship, a smaller-than relationship, or an equal-to relationship. In a case where the constellation point in the element is not to be extended in the constellation diagram, the real part and the imaginary part of the constellation point in the element are set to be in an equality relationship.

In the present disclosure, for a case where the constellation point in the element is to be extended in the constellation diagram, the constraint relationship of the constellation point in each element is determined according to a position of the constellation point in each element in the constellation diagram.

In some implementations, the judgment unit 2 is configured to, in response to that the constellation point in the element is located in a first region in the constellation diagram, determine that each of the constraint relationship of the real part and the constraint relationship of the imaginary part of the constellation point in the element is the equal-to relationship.

In some implementations, the judgment unit 2 is configured to, in response to that the constellation point in the element is located in a second region in the constellation diagram, and a distance between the constellation point in the element and a real axis is smaller than a preset first threshold, determine that the constraint relationship of the imaginary part of the constellation point in the element is the equal-to relationship, in response to that the real part of the constellation point in the element is greater than zero, determine that the constraint relationship of the real part of the constellation point in the element is the greater-than relationship or the equal-to relationship, in response to that the real part of the constellation point in the element is smaller than zero, determine that the constraint relationship of the real part of the constellation point in the element is the smaller-than relationship or the equal-to relationship; in response to that the constellation point in the element is located in the second region in the constellation diagram, and a distance between the constellation point in the element and an imaginary axis is smaller than a preset second threshold, determine that the constraint relationship of the real part of the constellation point in the element is the equal-to relationship, in response to that the imaginary part of the constellation point in the element is greater than zero, determine that the constraint relationship of the imaginary part of the constellation point in the element is the greater-than relationship or the equal-to relationship, in response to that the imaginary part of the constellation point in the element is smaller than zero, determine that the constraint relationship of the imaginary part of the constellation point in the element is the smaller-than relationship or the equal-to relationship.

In some implementations, the judgment unit 2 is configured to, in response to that the constellation point in the element is located in a third region in the constellation diagram, and the imaginary part of the constellation point in the element is greater than zero, determine that the constraint relationship of the imaginary part of the constellation point in the element is the greater-than relationship or the equal-to relationship; in response to that the constellation point in the element is located in the third region in the constellation diagram, and the imaginary part of the constellation point in the element is smaller than zero, determine that the constraint relationship of the imaginary part of the constellation point in the element is the smaller-than relationship or the equal-to relationship; in response to that the constellation point in the element is located in the third region in the constellation diagram, and the real part of the constellation point in the element is greater than zero, determine that the constraint relationship of the real part of the constellation point in the element is the greater-than relationship or the equal-to relationship; in response to that the constellation point in the element is located in the third region in the constellation diagram, and the real part of the constellation point in the element is smaller than zero, determine that the constraint relationship of the real part of the constellation point in the element is the smaller-than relationship or the equal-to relationship.

A distance between the first region and an origin is smaller than a distance between the second region and the origin, and the distance between the second region and the origin is smaller than a distance between the third region and the origin.

A constellation diagram of 16 QAM is taken as an example to illustrate the constraint relationship in the case where the constellation point in the element is to be extended in the constellation diagram. For the constellation diagram of 16 QAM in FIG. 4, constellation points in the constellation diagram may be classified into three classes including class A, class B, class C.

In the class A, the constellation points are located in an inner region (i.e., the first region) of the constellation diagram and are not allowed to be deteriorated in order to ensure that decisions are not affected.

In the class B, the constellation points are located in the second region of the constellation diagram, and a constraint for a real part or an imaginary part may be relaxed. For example, for four constellation points B1, B2, B3, and B4 in the class B, real parts thereof may be extended; for four constellation points B5, B6, B7, and B8 in the class B, imaginary parts thereof may be extended.

In the class C, the constellation points are located in the third region of the constellation diagram, and a constraint for a real part or an imaginary part may be relaxed. For example, for four constellation points in the class C shown in FIG. 4, real parts and imaginary parts thereof may be simultaneously extended.

It should be noted that conditions for determining whether the constellation point in the element is located in the first region, the second region, or the third region may be preset, for example, by setting distances between boundaries of the first region, the second region, and the third region and a real axis and between boundaries of the first region, the second region, and the third region and an imaginary axis, sizes and positions of the first region, the second region, and the third region in the constellation diagram may be defined.

Therefore, according to the position of the constellation point (i.e., the region to which the constellation point belongs) in each element of each first sub-signal in the serial QAM signal $\hat{s}$ output by the preprocessing unit 1 in the constellation diagram, constraint relationships of the real part and the imaginary part of the constellation point in each element are as follows: in response to that the constellation point in the element belongs to the class A, that is, in response to that the constellation point in the element is located in the first region in the constellation diagram, the constraint relationships of the real part and the imaginary part of the constellation point in the element each are the equal-to relationship ($=$).

In response to that the constellation point in the element belongs to the class B, that is, in response to that the constellation point in the element is located in the second region in the constellation diagram, following two scenes are expected to be distinguished.

In a first scene, in response to that the distance between the constellation point in the element and the real axis is smaller than a preset first threshold, that is, the constellation point in the element is located near the real axis (i.e., B1, B2, B3, B4), the constraint relationship of the imaginary part of the constellation point in the element is the equal-to relationship ($=$); in response to that the real part of the constellation point in the element is greater than zero (i.e., B3, B4), the constraint relationship of the real part of the constellation point in the element is the greater-than relationship or the equal-to relationship ($\geq$) in response to that the real part of the constellation point in the element is smaller than zero (i.e., B1, B2), the constraint relationship of the real part of the constellation point in the element is the smaller-than relationship or the equal-to relationship ($\leq$).

In a second scene, in response to that the distance between the constellation point in the element and the imaginary axis is smaller than a preset second threshold, that is, the constellation point in the element is located near the imaginary axis (i.e., B5, B6, B7, B8), the constraint relationship of the real part of the constellation point in the element is the equal-to relationship ($=$); in response to that the imaginary part of the constellation point in the element is greater than zero (i.e., B5, B6), the constraint relationship of the imaginary part of the constellation point in the element is the greater-than relationship or the equal-to relationship ($\geq$) in response to that the imaginary part of the constellation point in the element is smaller than zero (i.e., B7, B8), the constraint relationship of the imaginary part of the constellation point in the element is the smaller-than relationship or the equal-to relationship ($\leq$).

In response to that the constellation point in the element belongs to the class C, if the imaginary part of the constellation point in the element is greater than zero, the constraint relationship of the imaginary part of the constellation point in the element is the greater-than relationship or the equal-to relationship ($\geq$) in response to that the imaginary part of the constellation point in the element is smaller than zero, the constraint relationship of the imaginary part of the constellation point in the element is the smaller-than relationship or the equal-to relationship ($\leq$) in response to that the real part of the constellation point in the element is greater than zero, the constraint relationship of the real part of the constellation point in the element is the greater-than relationship or the equal-to relationship ($\geq$) in response to that the real part of the constellation point in the element is smaller than zero, the constraint relationship of the real part of the constellation point in the element is the smaller-than relationship or the equal-to relationship ($\leq$).

In some implementations, the convex optimization model is:

$$\min \|\hat{a}\|_\infty$$
$$\text{s.t. } Re(\hat{C}\hat{a}[i]) \overset{\geq}{\underset{<}{}} Re(\hat{s}[i])$$
$$Im(\hat{C}\hat{a}[i]) \overset{\geq}{\underset{<}{}} Im(\hat{s}[i]), i = (1, 2, \ldots, K*N),$$

K is a number of single-antenna users, N is a number of the subcarriers; $\hat{C}$ is the joint matrix, $\hat{a}$ is the joint time-domain signal, and $\hat{s}$ is the serial QAM signal;

$$\overset{\geq}{\underset{<}{}}$$

is a generalized inequality, and represents one of $>$, $<$, $=$.

Figure 4:
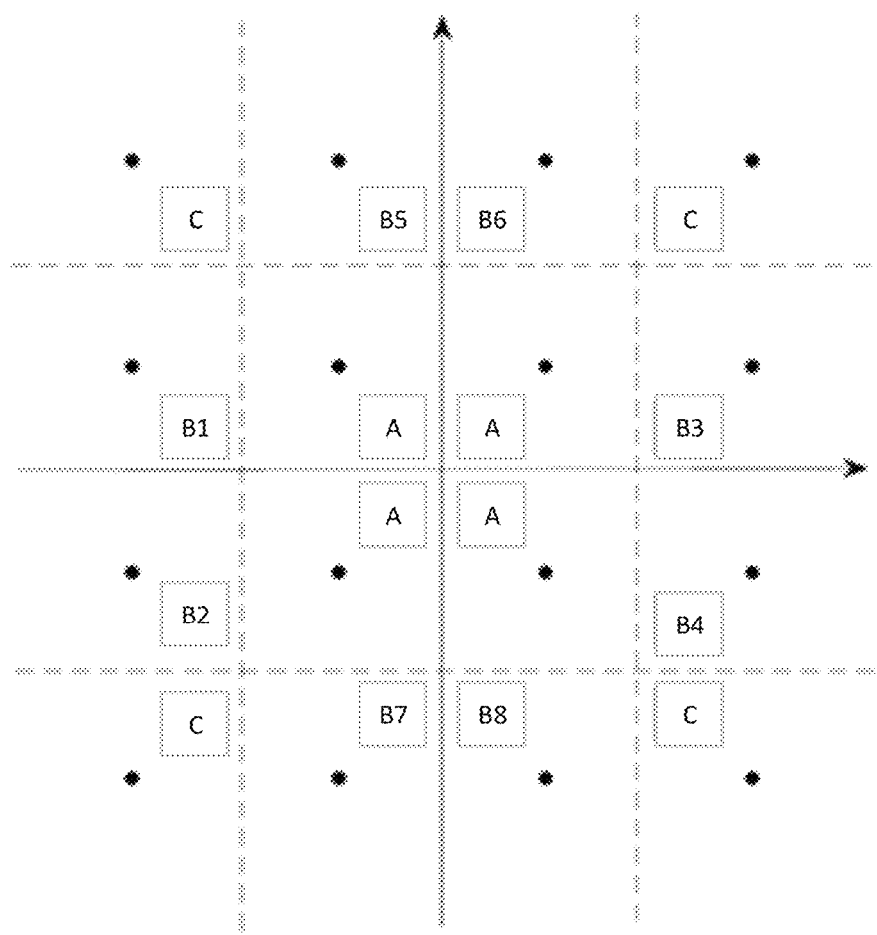
FIG. 4 is a constellation diagram of a 16 QAM modulation signal according to the present disclosure.

In response to that the judgment unit 2 determines that the constellation point in the element of the first sub-signal is to be extended in the constellation diagram, the constraint relationship of the real part and the constraint relationship of the imaginary part of the constellation point in the element are determined according to a position of the constellation point in the element in the constellation diagram. The constellation diagram of 16 QAM in FIG. 4 is illustrated as an example, and the constraint relationship of the constellation point in each element in FIG. 4 may be represented as follows.

(1) The constraint relationship of four constellation points in the class A is as follows:

$$\text{s.t. } Re(\hat{C}\hat{a}[i])=Re(\hat{s}[i])$$
$$Im(\hat{C}\hat{a}[i])=Im(\hat{s}[i]).$$

(2) The constellation points in the class B are classified into following two scenes.

In a first scene, in response to that the distance between the constellation point in the element and the real axis is smaller than the preset first threshold, that is, the constellation point in the element is located near the real axis (i.e., B1, B2, B3, B4), the constraint relationship is:

$$\text{s.t. } Re(\hat{C}\hat{a}[i]) \geq Re(\hat{s}[i]), \text{ if } Re(\hat{s}[i])>0$$
$$Re(\hat{C}\hat{a}[i]) \leq Re(\hat{s}[i]), \text{ if } Re(\hat{s}[i])<0$$
$$Im(\hat{C}\hat{a}[i])=Im(\hat{s}[i]).$$

In a second scene, in response to that the distance between the constellation point in the element and the imaginary axis is smaller than the preset second threshold, that is, the constellation point in the element is located near the imaginary axis (i.e., B5, B6, B7, B8), the constraint relationship is:

$$\text{s.t. } Im(\hat{C}\hat{a}[i]) \geq Im(\hat{s}[i]), \text{ if } Im(\hat{s}[i])>0$$
$$Im(\hat{C}\hat{a}[i]) \leq Im(\hat{s}[i]), \text{ if } Im(\hat{s}[i])<0$$
$$Re(\hat{C}\hat{a}[i])=Re(\hat{s}[i]).$$

(3) The constraint relationship of four constellation points in the class C is as follows:

$$\text{s.t. } Re(\hat{C}\hat{a}[i]) \geq Re(\hat{s}[i]), \text{ if } Re(\hat{s}[i])>0$$
$$Re(\hat{C}\hat{a}[i]) \leq Re(\hat{s}[i]), \text{ if } Re(\hat{s}[i])<0$$
$$Im(\hat{C}\hat{a}[i]) \geq Im(\hat{s}[i]), \text{ if } Im(\hat{s}[i])>0$$
$$Im(\hat{C}\hat{a}[i]) \leq Im(\hat{s}[i]), \text{ if } Im(\hat{s}[i])<0.$$

The processing unit 3 solves the convex optimization model with the constraint relationship to finally obtain a time-domain signal after reducing the PAPR. For the case where the constellation point in the element is to be extended in the constellation diagram, a common solution algorithm of convex optimization, such as a gradient descent algorithm, a newton iteration algorithm, or the like, may be used to solve the convex optimization model. It should be noted that the constraint relationship is not unique, for example, in order to prevent the constellation diagram from being excessively extended, a boundary of the extension may be constrained, so that a maximum value of the entire constellation diagram does not exceed a certain value, and any limited extension of the constellation diagram is within the protection scope of the present disclosure.

In some implementations, the processing unit 3 is configured to, in response to that the constellation point in the element of the first sub-signal is determined to be not extended in the constellation diagram, transform the convex optimization model by using a split Bregman algorithm and the constraint relationship of the constellation point in each element, and determine the joint time-domain signal of antenna channels according to the transformed convex optimization model.

In some implementations, the processing unit 3 is configured to generate an initial model according to the convex optimization model and the constraint relationship of the constellation point in each element; transform the initial model into a first model with a constraint relationship; transform the first model into a second model without the constraint relationship; split the second model into a first sub-model according to the split Bregman algorithm, and optimize the first sub-model; and for the optimized first sub-model, iterate for a preset number of times, and determine the joint time-domain signal of the antenna channels.

Referring to FIG. 1 and FIG. 3, two outputs $\hat{C}$ and $\hat{s}$ of the preprocessing unit 1 are used as inputs of the processing unit 3, the processing unit 3 establishes the convex optimization model according to the constraint relationship of the real part and the constraint relationship of the imaginary part of the constellation point in each element output by the judgment unit 2, and selects different algorithms to solve the convex optimization model according to the determining result obtained by determining that whether the constellation point in the element is to be extended in the constellation diagram. In response to that the constellation point in the element is to be extended in the constellation diagram, the convex optimization model is solved by using a convex optimization algorithm in the existing technology; in response to that the constellation point in the element is not to be extended in the constellation diagram, the convex optimization model is solved by the split Bregman algorithm. Finally, the serial signal (i.e., the joint time-domain signal â) of all the antenna channels after reducing the PAPR is obtained.

A process of solving the convex optimization model by the split-Bregman algorithm in the case where the constellation point in the element is not to be extended in the constellation diagram is described in detail below with reference to FIG. 12.

In response to that the constellation point in the element is not to be extended in the constellation diagram, the constraint relationship corresponding to the constellation point in each element is the equal-to relationship (=), and the convex optimization model is as follows:

$$\min \|\hat{a}\|_\infty$$

$$\text{s.t. } \hat{C}\hat{a}=\hat{s}.$$

A process of the processing unit 3 solving the convex optimization model by using the split-Bregman algorithm includes following operations S31 to S36.

At operation S31, generating an initial model without a constraint relationship according to the convex optimization model and the constraint relationship of the constellation point in each element.

In this operation, a convex optimization problem with a constraint is transformed into a convex optimization problem without any constraint, and through an extension operation, the initial model without any constraint relationship can be generated:

$$\min \|\hat{a}\|_\infty + \frac{\lambda}{2}\|\hat{s} - \hat{C}\hat{a}\|_2^2,$$

λ is a preset regularization parameter and λ>0.

At operation S32, transforming the initial model into a first model with a constraint relationship.

In this operation, an auxiliary split variable d is added to the initial model and satisfies d=â, so as to transform the initial model into the first model with the constraint relationship:

$$\min \|d\|_\infty + \frac{\lambda}{2}\|\hat{s} - \hat{C}\hat{a}\|_2^2$$
$$\text{s.t. } d = \hat{a}.$$

At operation S33, transforming the first model into a second model without the constraint relationship.

In this operation, the first model with the constraint relationship is transformed into the second model without the constraint relationship:

$$\min_{d,\hat{a}} \|d\|_\infty + \frac{\lambda}{2}\|\hat{s} - \hat{C}\hat{a}\|_2^2 + \frac{\mu}{2}\|d - \hat{a}\|_2^2,$$

μ is a regularization parameter and μ>0.

Further, the second model described above may be rewritten into:

$$\min_{d,\hat{a}} f(\hat{a}, d) + \frac{\mu}{2}\|d - \hat{a}\|_2^2 + \frac{\kappa}{2}\|d\|_2^2, \ f(\hat{a}, d) = \|d\|_\infty + \frac{\lambda}{2}\|\hat{s} - \hat{C}\hat{a}\|_2^2,$$

a Bregman distance of $f(\hat{a}, d)$ is $D_f^p(\hat{a},\hat{a}', d, d') = f(\hat{a}, d) - f(\hat{a}', d') - \langle p_{\hat{a}}, \hat{a}-\hat{a}'\rangle - \langle p_d, d-d'\rangle$, $p_{\hat{a}}$ and $p_d$ respectively represent sub-gradient vectors of the function $f(\hat{a}, d)$.

At operation S34, splitting the second model into a first sub-model according to the split Bregman algorithm.

In this operation, the second model is split into the first sub-model according to a principle of the split-Bregman algorithm:

$$\left(\hat{a}^{(k+1)}, d^{(k+1)}\right) = \operatorname*{argmin}_{\hat{a},d} D_f^p\left(\hat{a}, \hat{a}^{(k+1)}, d, d^{(k+1)}\right) + \frac{\mu}{2}\|d - \hat{a}\|_2^2 + \frac{\kappa}{2}\|d\|_2^2;$$

$$D_f^p\left(\hat{a}, \hat{a}^{(k)}, d, d^{(k)}\right) = f(\hat{a}, d) - f\left(\hat{a}^{(k)}, d^{(k)}\right) - \langle p_{\hat{a}}^{(k)},$$
$$\hat{a} - \hat{a}^{(k)}\rangle - \langle p_d^{(k)}, d - d^{(k)}\rangle;$$

$p_{\hat{a}}^{(k)}$ and $p_d^{(k)}$ respectively represent sub-gradient vectors of the function $f(\hat{a}, d)$ at k-th iteration, and may be represented as $(p_{\hat{a}}^{(k)}, p_d^{(k)}) \in \partial f(\hat{a}, d)$, $p_{\hat{a}}^{(k+1)} = p_{\hat{a}}^{(k)} - \mu(\hat{a}^{(k+1)} - d^{(k+1)})$, $p_d^{(k+1)} = p_d^{(k)} - \mu(d^{(k+1)} - \hat{a}^{(k+1)})$.

At operation S35, optimizing the first sub-model.

In this operation, firstly, $$b^{(k+1)} = b^{(k)} + \left(\hat{a}^{(k+1)} - d^{(k+1)}\right) = \sum_{i=1}^{k+1}\left(\hat{a}^{(i)} - d^{(i)}\right)$$

is defined, accordingly, the first sub-model may be transformed into:

$$\left(\hat{a}^{(k+1)}, d^{(k+1)}\right) = \operatorname*{argmin}_{\hat{a},d} D_f^p\left(\hat{a}, \hat{a}^{(k+1)}, d, d^{(k+1)}\right) + \frac{\mu}{2}\|d - \hat{a}\|_2^2 + \frac{\kappa}{2}\|d\|_2^2$$
$$= \operatorname*{argmin}_{\hat{a},d} \|d\|_\infty + \frac{\lambda}{2}\|\hat{s} - \hat{C}\hat{a}\|_2^2 + \frac{\mu}{2}\|d - \hat{a} + b^{(k+1)}\|_2^2 + \frac{\kappa}{2}\|d\|_2^2.$$

At operation S36, for the optimized first sub-model, iterating for a preset number of times, and determining the joint time-domain signal â of antenna channels.

Upon completing each iteration, let k=k+1, and operation S36 is executed again, an optimal/desired solution of the convex optimization model, i.e., the joint time-domain signal $\hat{a}=[a_1^T, a_2^T, \ldots, a_M^T]^T$ of the antenna channels, is obtained after iterating for the preset number of times.

Figure 5:
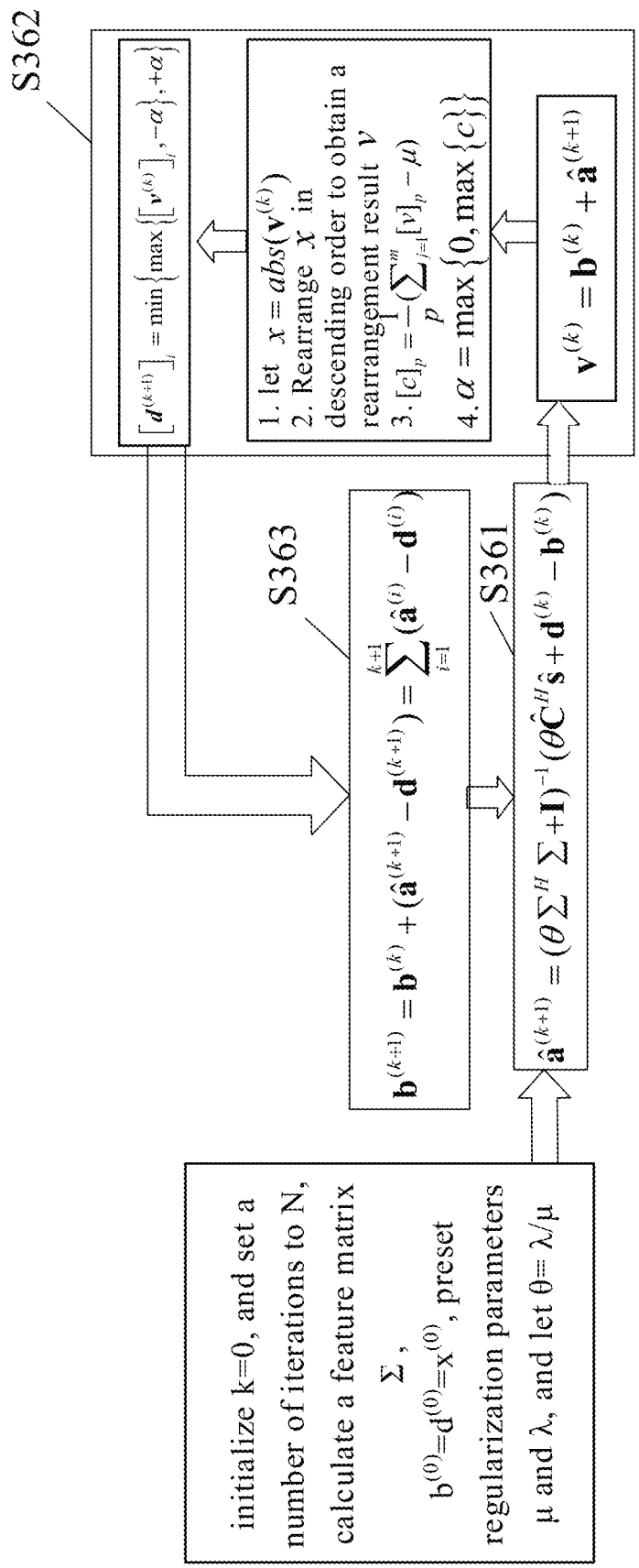
FIG. 5 is a schematic diagram of solving a convex optimization model by using a split-Bregman algorithm according to the present disclosure.

An operation of determining the joint time-domain signal â of the antenna channels in an iteration process according to the optimized first sub-model is described in detail below with reference to FIG. 5. As shown in FIG. 5, the processing unit 3 sets an initial value of a number of iterations k to 0, i.e., k=0, and sets a maximum of the number of iterations to N, calculates a feature matrix Σ of the joint matrix Ĉ, $b^{(0)}=d^{(0)}=x^{(0)}$, presets regularization parameters μ and λ, and lets θ=λ/μ.

At operation S361, calculating and updating the joint time-domain signal â of the antenna channels.

In this operation, the joint time-domain signal â of the antenna channels is calculated according to a following formula:

$$\hat{a}^{(k+1)} = (\theta 9\Sigma^H\Sigma + I)^{-1}(\theta\hat{C}^H\hat{s} + d^{(k)} - b^{(k)}), \ \theta = \lambda/\mu. \ \Sigma \text{ is an eigenvalue matrix of } \hat{C}.$$

At operation S362, updating and calculating d.

It should be noted that an infinite norm constraint may be discarded because a 2-norm constraint is included therein.

Operation S362 may include following operations a to c.

At operation a, let $v^{(k)}=b^{(k)}+\hat{a}^{(k+1)}$.

At operation b, calculating a threshold $\alpha$ of crest factor reduction.

For calculating the threshold $\alpha$ of crest factor reduction, let $x=abs(v^{(k)})$, x is rearranged in descending order to obtain a rearrangement result v;

$$[c]_p = \frac{1}{p}\left(\sum_{j=1}^m [v]_p - \mu\right)$$

is calculated, p=1,2, ..., M*N, M*N is a length of the vector v; the threshold $\alpha$ of crest factor reduction is calculated as: $\alpha=\max\{0, \max\{c\}\}$.

At operation c, reducing $v^{(k)}$ by using the threshold $\alpha$ of crest factor reduction to obtain d, i.e., $[d^{(k+1)}]_i=\min\{\max\{[v^{(k)}]_i, -\alpha\}, +\alpha\}$.

It should be noted that, since the parameter b has been defined for optimizing the first sub-model, a value of the parameter b is expected to be updated during each iteration. Therefore, after operation S361 and operation S362 are performed, operation S363 is to be performed.

At operation S363, updating the parameter b.

In this operation, the parameter b is updated according to a following formula:

$$b^{(k+1)} = b^{(k)} + \left(\hat{a}^{(k+1)} - d^{(k+1)}\right) = \sum_{i=1}^{k+1}\left(\hat{a}^{(i)} - d^{(i)}\right).$$

As shown in FIG. 1, the conversion unit 4 converts the joint time-domain signal â (i.e. the serial signal) of the antenna channels determined by the processing unit 3 into a time-domain signal $a_m$ on each antenna channel. That is, the conversion unit 4 performs a serial-to-parallel conversion on the joint time-domain signal â output by the processing unit 3 to obtain the time-domain signal $a_m$, m=1, ..., M processed by reducing the PAPR on each antenna channel.

Figure 6:
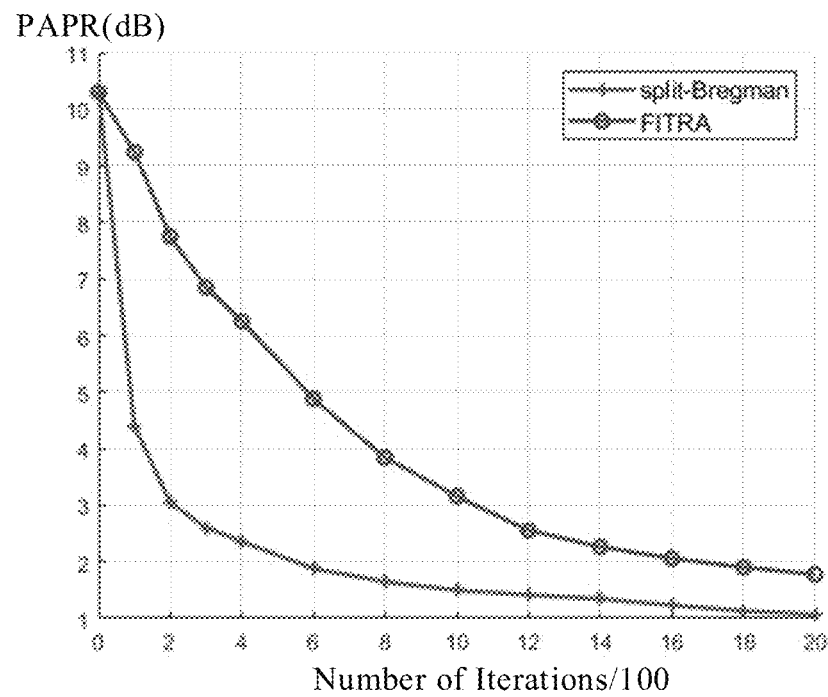
FIG. 6 is a schematic diagram illustrating PAPR performance of solving a convex optimization model by using a split-Bregman algorithm compared with PAPR performance of the existing scheme under different numbers of iterations of 16×4 MIMO.

FIG. 6 is a schematic diagram illustrating PAPR performance of solving a convex optimization model by using a split-Bregman algorithm compared with PAPR performance of the existing scheme under different numbers of iterations in response to that a number of transmit antennas at a base station is M=16 and a number of single-antenna users is K32 4, i.e., under 16×4 MIMO, and a number of subcarriers is N=1024. It can be seen from FIG. 6, under a same number of iterations, the PAPR performance of solving the convex optimization model by using the split-Bregman algorithm is obviously superior to that of the existing FITRA scheme; for a same PAPR, a number of iterations for employing the scheme provided in the present disclosure is significantly less than that for the existing FITRA scheme. Compared with the existing scheme, the present disclosure has very obvious performance advantages.

Figure 7:
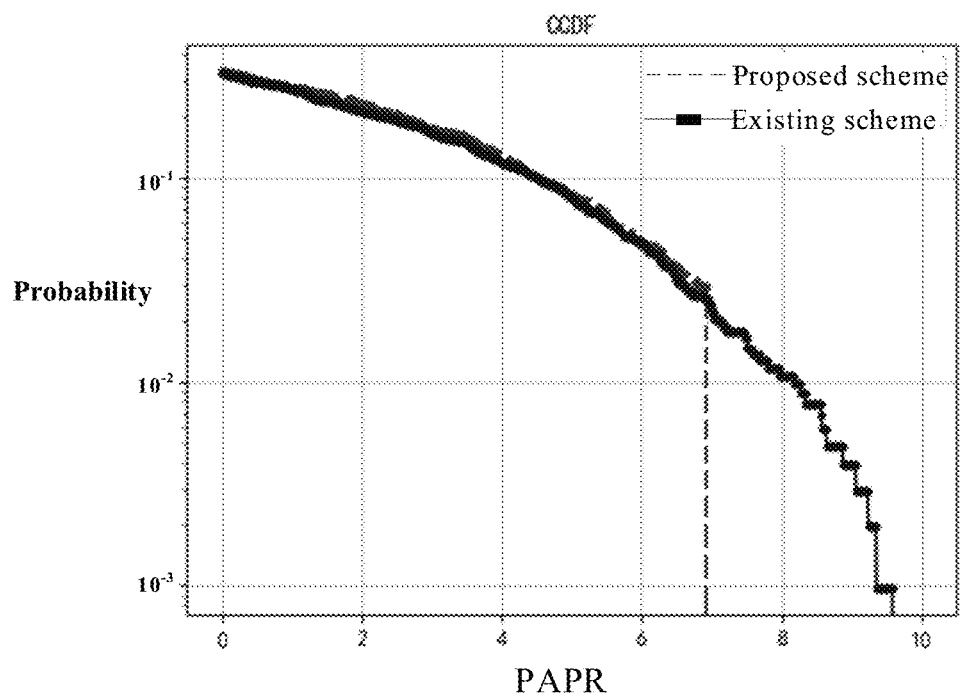
FIG. 7 is a schematic diagram illustrating PAPR performance of a scheme of constellation diagram extension according to the present disclosure compared with PAPR performance of the existing scheme under 4×4 MIMO.

FIG. 7 is a schematic diagram illustrating PAPR performance of a scheme of constellation diagram extension according to the present disclosure compared with PAPR performance of the existing scheme in response to that a number of transmit antennas at a base station is M=4 and a number of single-antenna users is K=4, i.e., under 4×4 MIMO, and a number of subcarriers is N=1024. It can be seen from FIG. 7, the PAPR of the scheme of constellation point extension provided in the present disclosure is about 6.9 dB, and the PAPR of the existing scheme is about 9.6 dB, in such scenario, compared with the existing scheme, the PAPR is improved by 2.7 dB through the scheme of constellation point extension provided in the present disclosure, and the scheme of constellation point extension provided in the present disclosure has obvious advantages, and the performance of crest factor reduction of the scheme of constellation point extension provided in the present disclosure is obviously better than that of the existing scheme.

FIG. 8 is a schematic diagram illustrating a constellation diagram of a scheme of constellation diagram extension according to the present disclosure compared with a constellation diagram of the existing scheme under 4×4 MIMO. It can be seen from FIG. 8, after the PAPR is reduced by the scheme of constellation point extension according to the present disclosure, the constellation point outside the constellation diagram is obviously extended, but the constellation point in the constellation diagram of the existing scheme is not to be extended. It should be noted that the above extension of the constellation point does not affect the hard decision for the constellation diagram, and does not cause a decision error for a bit stream, so that there is substantially no impact on demodulation at the receiving terminal.

Compared with the scheme of reducing the peak-to-average power ratio in the existing scheme, the signal processing scheme provided in the present disclosure has following advantages:

(1) the signal processing scheme provided in the present disclosure can be applied to wider application scenarios, including all MIMO scenarios, due to an addition of determining that whether the constellation point in each element is to be extended; and (2) the signal processing scheme provided in the present disclosure has better performance of crest factor reduction, compared with the existing scheme, the scheme of iteratively solving the convex optimization model based on the split-Bregman algorithm expects fewer iteration times to can achieve the same performance of crest factor reduction under fewer iterations, and has a faster convergence rate is higher.

The signal processing scheme provided in the present disclosure reduces the PAPR by designing appropriate precoding and constellation point extension, and can be applied to conventional MIMO scenarios (i.e., MIMO scenarios with the number of transmit antennas/the number of receive antennas being less than 2, for example, a 4×4 MIMO scenario and a 8×8 MIMO scenario) and massive MIMO scenarios (i.e., MIMO scenarios with the number of transmit antennas/the number of receive antennas being greater than 2, for example, a 32×4 MIMO scenario and a 64×4 MIMO scenario). In response to that the constellation point in the element is to be extended, a greater free degree can be brought, so that the signal processing scheme can be applied to any MIMO scenario. In response to that the constellation point in the element is not to be extended, the signal processing scheme can be applied to massive MIMO scenarios. In a scene where the constellation point in element is not to be extended, the split-Bregman algorithm is used for solving the convex optimization model, so that the PAPR of a system signal can be reduced to a great extent by using fewer iterations, and balance between performance and complexity is realized. Compared with the existing scheme, the free degree of precoding in the MIMO can be utilized, and the free degree of the constellation diagram can also be utilized, the application scenario is enlarged, and the EVM cannot be deteriorated because the crest factor reduction is not performed on signals.

In the present disclosure, the signal processed by the signal processing apparatus may be an LTE (Long Term Evolution) signal, or may be an NR (New Radio, New air interface) signal in a new-generation communication system.

The present disclosure further provides a signal processing method, as shown in FIG. 1 and FIG. 9, the signal processing method includes following operations S11 to S15.

At operation S11, generating a joint matrix according to channel matrixes of subcarriers, and performing a parallel-to-serial conversion on QAM signals of the subcarriers to obtain a serial QAM signal including a first sub-signal corresponding to each subcarrier.

At operation S12, determining a constraint relationship of a constellation point in each element according to a determining result obtained by determining that whether the constellation point in each element of the first sub-signal is to be extended in a constellation diagram.

At operation S13, establishing a convex optimization model according to the joint matrix, the serial QAM signal and the determining result for the constellation point in each element.

At operation S14, determining a joint time-domain signal of antenna channels according to the constraint relationship of the constellation point in each element and the convex optimization model.

At operation S15, performing a serial-to-parallel conversion on the joint time-domain signal to obtain a time-domain signal corresponding to each antenna channel.

In the signal processing method provided in the present disclosure, the joint matrix is generated according to the channel matrixes of the subcarriers, and the parallel-to-serial conversion is performed on the QAM signals of the subcarriers to obtain the serial QAM signal including the first sub-signal corresponding to each subcarrier; the constraint relationship of the constellation point in each element is determined according to the determining result obtained by determining that whether the constellation point in each element of the first sub-signal is to be extended in the constellation diagram; the convex optimization model is established according to the joint matrix, the serial QAM signal and the determining result for the constellation point in each element; the joint time-domain signal of antenna channels is determined according to the constraint relationship of the constellation point in each element and the convex optimization model; and the serial-to-parallel conversion is performed on the joint time-domain signal to obtain the time-domain signal corresponding to each antenna channel. According to the present disclosure, whether the constellation point in each element of the first sub-signal is to be extended in the constellation diagram is determined, and the constraint relationship of the constellation point in each element is determined according to the determining result, and in a case where the constellation point in the element is to be extended, on one hand, a free degree of precoding and a free degree of the constellation diagram in MIMO can be simultaneously utilized to reduce the PAPR, so that a greater free degree is brought, so that the signal processing method provided in the present disclosure can be applied to wider application scenarios including massive MIMO scenarios and conventional MIMO scenarios, and generality of usage of the signal processing method is improved; on the other hand, a direction of extension is controllable, performance of demodulating a signal at a receiving terminal cannot be affected, so that an accuracy of determining for the constellation point can be ensured by using a hard decision mode; in the present disclosure, a joint processing of crest factor reduction, precoding and IDFT can be implemented, and on a basis of reducing the PAPR of the signal, the EVM cannot be deteriorated, a subsequent operation of crest factor reduction can be omitted, resulting in a simplified signal processing process.

Figure 10:
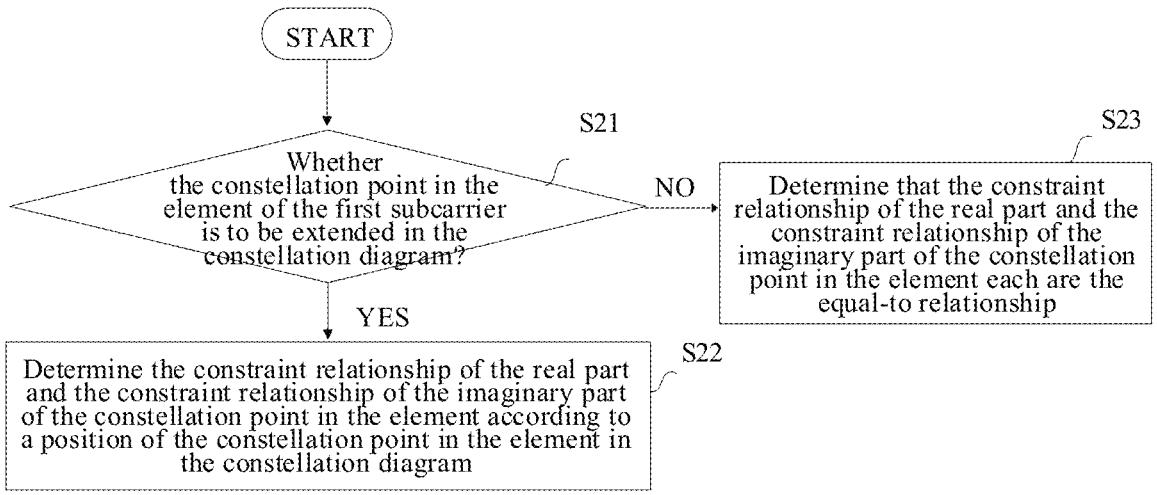
FIG. 10 is a schematic flowchart for determining a constraint relationship according to the present disclosure.

In some implementations, the constraint relationship includes a constraint relationship of a real part and a constraint relationship of an imaginary part. As shown in FIG. 10, the determining a constraint relationship of a constellation point in each element according to a determining result obtained by determining that whether the constellation point in each element of the first sub-signal is to be extended in a constellation diagram may include following operations S21 to S23.

At operation S21, determining whether the constellation point in the element of the first subcarrier is to be extended in the constellation diagram, in response to that the constellation point is not to be extended, performing operation S23; in response to that the constellation point is to be extended, performing operation S22.

At operation S22, determining the constraint relationship of the real part and the constraint relationship of the imaginary part of the constellation point in the element according to a position of the constellation point in the element in the constellation diagram.

The constraint relationship of the real part and the constraint relationship of the imaginary part include a greater-than relationship, a smaller-than relationship, or an equal-to relationship. The determining the constraint relationship of the real part and the constraint relationship of the imaginary part of the constellation point in the element according to a position of the constellation point in the element in the constellation diagram is described in detail below with reference to FIG. 11.

At operation S23, determining that each of the constraint relationship of the real part and the constraint relationship of the imaginary part of the constellation point in the element is the equal-to relationship.

Figure 11:
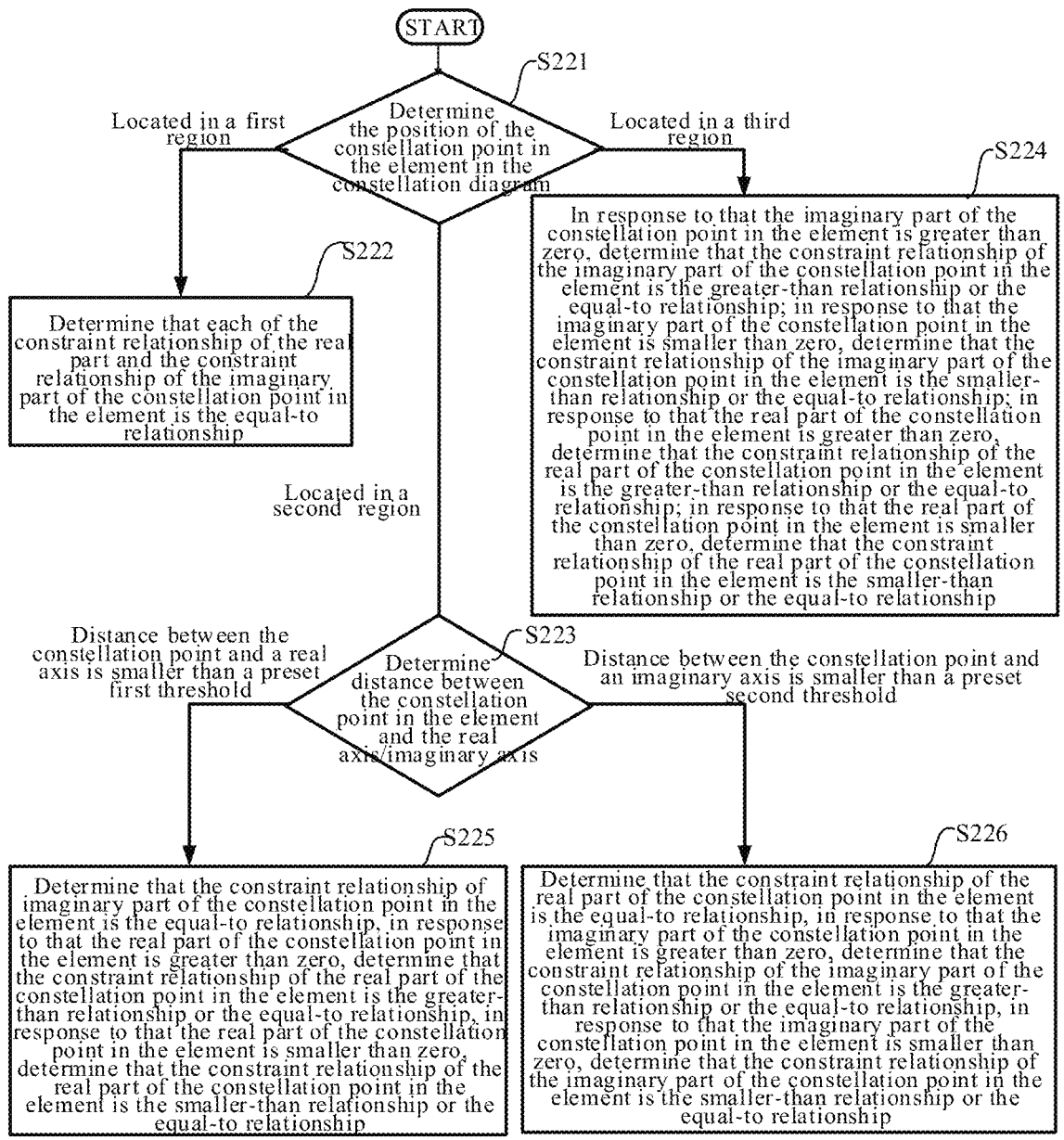
FIG. 11 is a schematic flowchart for determining a constraint relationship according to a position of a constellation point in a constellation diagram according to the present disclosure.

An implementation process of the determining the constraint relationship of the real part and the constraint relationship of the imaginary part of the constellation point in the element according to a position of the constellation point in the element in the constellation diagram (i.e., operation S22) is described in detail below with reference to FIG. 11. As shown in FIG. 11, operation S22 includes following operations S221 to S226.

At operation S221, determining the position of the constellation point in the element in the constellation diagram, in response to that the constellation point in the element is located in a first region in the constellation diagram, performing operation S222; in response to that the constellation point in the element is located in a second region in the constellation diagram, performing operation S223; in response to that the constellation point in the element is located in a third region in the constellation diagram, performing operation S224.

At operation S222, determining that each of the constraint relationship of the real part and the constraint relationship of the imaginary part of the constellation point in the element is the equal-to relationship.

At operation S223, in response to that a distance between the constellation point in the element and a real axis is smaller than a preset first threshold, performing operation S225; in response to that a distance between the constellation point in the element and an imaginary axis is smaller than a preset second threshold, performing operation S226.

At operation S224, in response to that the imaginary part of the constellation point in the element is greater than zero, determining that the constraint relationship of the imaginary part of the constellation point in the element is the greater-than relationship or the equal-to relationship; in response to that the imaginary part of the constellation point in the element is smaller than zero, determining that the constraint relationship of the imaginary part of the constellation point in the element is the smaller-than relationship or the equal-to relationship; in response to that the real part of the constellation point in the element is greater than zero, determining that the constraint relationship of the real part of the constellation point in the element is the greater-than relationship or the equal-to relationship; in response to that the real part of the constellation point in the element is smaller than zero, determining that the constraint relationship of the real part of the constellation point in the element is the smaller-than relationship or the equal-to relationship.

At operation S225, determining that the constraint relationship of the imaginary part of the constellation point in the element is the equal-to relationship, in response to that the real part of the constellation point in the element is greater than zero, determining that the constraint relationship of the real part of the constellation point in the element is the greater-than relationship or the equal-to relationship, in response to that the real part of the constellation point in the element is smaller than zero, determining that the constraint relationship of the real part of the constellation point in the element is the smaller-than relationship or the equal-to relationship.

At operation S226, determining that the constraint relationship of the real part of the constellation point in the element is the equal-to relationship, in response to that the imaginary part of the constellation point in the element is greater than zero, determining that the constraint relationship of the imaginary part of the constellation point in the element is the greater-than relationship or the equal-to relationship, in response to that the imaginary part of the constellation point in the element is smaller than zero, determining that the constraint relationship of the imaginary part of the constellation point in the element is the smaller-than relationship or the equal-to relationship.

In some implementations, the convex optimization model is:

$$\min \|\hat{a}\|_\infty$$
$$\text{s.t.} \quad \text{Re}(\hat{C}\hat{a}[i]) \underset{<}{\overset{>}{\gtrless}} \text{Re}(\hat{s}[i])$$
$$\text{Im}(\hat{C}\hat{a}[i]) \underset{<}{\overset{>}{\gtrless}} \text{Im}(\hat{s}[i]), \quad i = (1, 2, \ldots, K*N),$$

K is a number of single-antenna users, N is a number of the subcarriers; $\hat{C}$ is the joint matrix, $\hat{a}$ is the joint time-domain signal, and $\hat{s}$ is the serial QAM signal;

$$\underset{<}{\overset{>}{\gtrless}}$$

is a generalized inequality, and represents one of >, <, =.

In some implementations, the determining a joint time-domain signal of antenna channels according to the constraint relationship of the constellation point in each element and the convex optimization model (i.e., operation S14) includes: in response to that the constellation point in the element of the first sub-signal is not to be extended in the constellation diagram, transforming the convex optimization model by using a split Bregman algorithm and the constraint relationship of the constellation point in each element, and determining the joint time-domain signal of the antenna channels according to the transformed convex optimization model.

Figure 12:
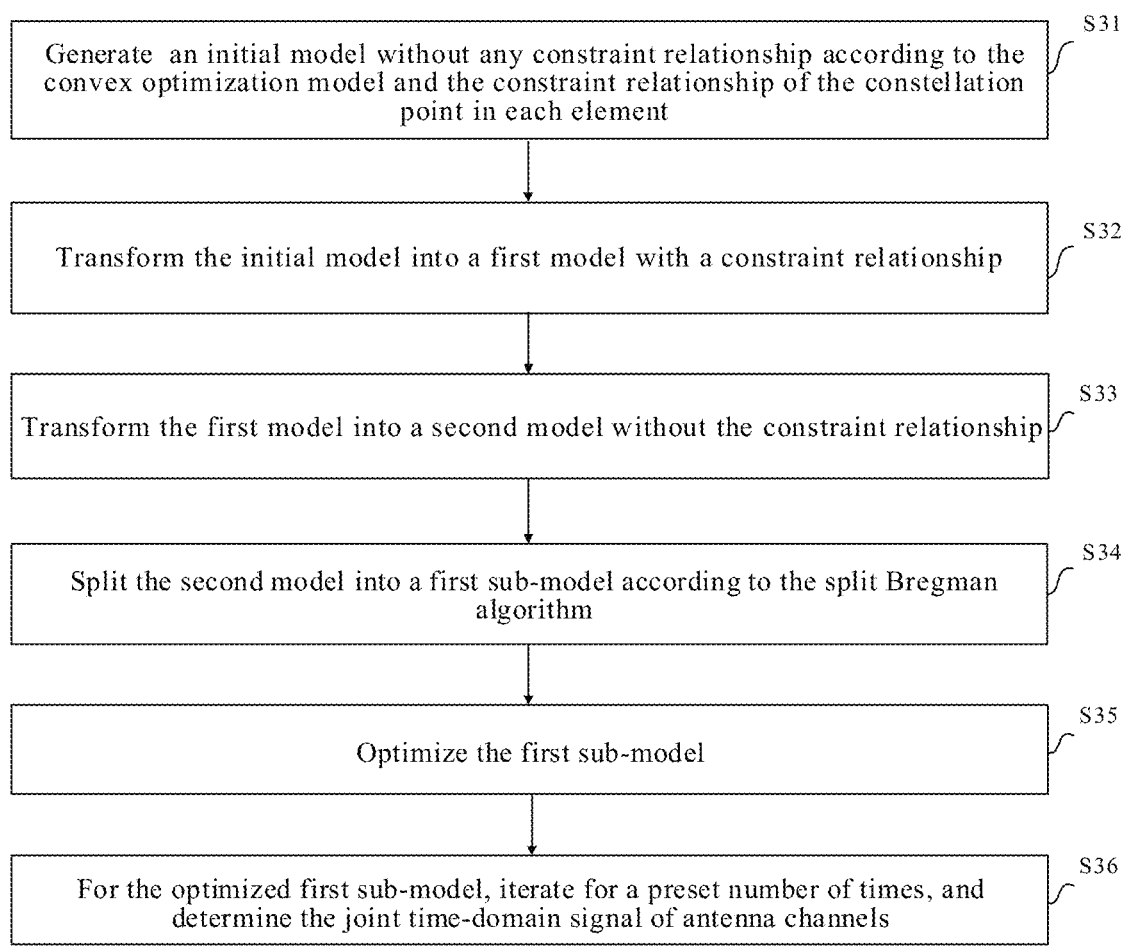
FIG. 12 is a schematic flowchart for solving a convex optimization model by using a split-Bregman algorithm according to the present disclosure.

In some implementations, as shown in FIG. 12, the transforming the convex optimization model by using a split Bregman algorithm and the constraint relationship of the constellation point in each element, and determining the joint time-domain signal of the antenna channels according to the transformed convex optimization model includes operation S31 to S36.

At operation S31, generating an initial model without a constraint relationship according to the convex optimization model and the constraint relationship of the constellation point in each element.

In this operation, a convex optimization problem with a constraint is transformed into a convex optimization problem without any constraint, and through an extension operation, the initial model without any constraint relationship can be generated:

$$\min \|\hat{a}\|_\infty + \frac{\lambda}{2}\|\hat{s} - \hat{C}\hat{a}\|_2^2,$$

$\lambda$ is a preset regularization parameter and $\lambda > 0$.

At operation S32, transforming the initial model into a first model with a constraint relationship.

In this operation, an auxiliary split variable d is added to the initial model and satisfies d=$\hat{a}$, so as to transform the initial model into the first model with the constraint relationship:

$$\min \|d\|_\infty + \frac{\lambda}{2}\|\hat{s} - \hat{C}\hat{a}\|_2^2.$$
$$\text{s.t.} \quad d = \hat{a}$$

At operation S33, transforming the first model into a second model without the constraint relationship.

In this operation, the first model with the constraint relationship is transformed into the second model without the constraint relationship:

$$\min_{d,\hat{a}} \|d\|_\infty + \frac{\lambda}{2}\|\hat{s} - \hat{C}\hat{a}\|_2^2 + \frac{\mu}{2}\|d - \hat{a}\|_2^2,$$

$\mu$ is a regularization parameter and $\mu > 0$.

Further, the second model described above may be rewritten into:

$$\min_{d,\hat{a}} f(\hat{a}, d) + \frac{\mu}{2}\|d - \hat{a}\|_2^2 + \frac{\kappa}{2}\|d\|_2^2, \quad f(\hat{a}, d) = \|d\|_\infty + \frac{\lambda}{2}\|\hat{s} - \hat{C}\hat{a}\|_2^2,$$

a Bregman distance of $f(â,d)$ is $D_f^p(â,â', d, d')=f(â, d)-f(â', d')-\langle p_â, â-â'\rangle-\langle p_d, d-d'\rangle$, $p_â$ and $p_d$ respectively represent sub-gradient vectors of the function $f(â, d)$.

At operation S34, splitting the second model into a first sub-model according to the split Bregman algorithm.

In this operation, the second model is split into the first sub-model according to a principle of the split-Bregman algorithm:

$$\left(â^{(k+1)}, d^{(k+1)}\right) = \arg\min_{â,d} D_f^p\left(â, â^{(k+1)}, d, d^{(k+1)}\right) + \frac{\mu}{2}\|d - â\|_2^2 + \frac{\kappa}{2}\|d\|_2^2;$$

$D_f^p(â, â^{(k)}, d, d^{(k)})=f(â, d)-f(â^{(k)}, d^{(k)})-\langle p_â^{(k)}, â-â^{(k)}\rangle-\langle p_d^{(k)}, d-d^{(k)}\rangle$; $p_â^{(k)}$ and $p_d^{(k)}$ respectively represent sub-gradient vectors of the function $f(â, d)$ at k-th iteration, and may be represented as $(p_â^{(k)}, p_d^{(k)})\in \partial f(â, d)$, $p_â^{(k+1)}=p_â^{(k)}-\mu(â^{(k+1)}-d^{(k+1)})$, $p_d^{(k+1)}=p_d^{(k)}-\mu(d^{(k+1)}-â^{(k+1)})$.

At operation S35, optimizing the first sub-model.

In this operation, firstly, $$b^{(k+1)} = b^{(k)} + \left(â^{(k+1)} - d^{(k+1)}\right) = \sum_{i=1}^{k+1}\left(â^{(i)} - d^{(i)}\right)$$

is defined, accordingly, the first sub-model may be transformed into:

$$\begin{aligned}\left(â^{(k+1)}, d^{(k+1)}\right) &= \arg\min_{â,d} D_f^p\left(â, â^{(k+1)}, d, d^{(k+1)}\right) + \frac{\mu}{2}\|d - â\|_2^2 + \frac{\kappa}{2}\|d\|_2^2 \\ &= \min_{d,â} \|d\|_\infty + \frac{\lambda}{2}\|\hat{s} - \hat{C}â\|_2^2 + \frac{\mu}{2}\|d - â + b^{(k+1)}\|_2^2 + \frac{\kappa}{2}\|d\|_2^2\end{aligned}.$$

At operation S36, for the optimized first sub-model, iterating for a preset number of times, and determining the joint time-domain signal â of antenna channels.

Upon completing each iteration, let k=k+1, operation S36 is executed again, and an optimal/desired solution of the convex optimization model, i.e., the joint time-domain signal $â=[a_1^T, a_2^T, \ldots, a_M^T]^T$ of the antenna channels, is obtained after iterating for the preset number of times.

The present disclosure discloses the exemplary embodiments, and although specific terms are employed, they are used and should only be interpreted in a generic and descriptive meaning, but not for purposes of a limitation. It is apparent to those skilled in the art that features, characteristics and/or elements described in connection with specific embodiments may be used alone or in combination with features, characteristics and/or elements described in connection with other embodiments, unless explicitly stated otherwise. Therefore, it should be understood by those skilled in the art that various changes in form and details may be made without departing from the scope of the present disclosure as set forth in the appended claims.

What is claimed is:

1. A signal processing apparatus, comprising: a preprocessing unit, a judgment unit, a processing unit and a conversion unit;

the preprocessing unit is configured to generate a joint matrix according to channel matrixes of subcarriers, and perform a parallel-to-serial conversion on QAM signals of the subcarriers to obtain a serial QAM signal comprising a first sub-signal corresponding to each subcarrier;

the judgment unit is configured to determine a constraint relationship of a constellation point in each element according to a determining result obtained by determining that whether the constellation point in each element of the first sub-signal is to be extended in a constellation diagram;

the processing unit is configured to establish a convex optimization model according to the joint matrix, the serial QAM signal and the determining result for the constellation point in each element, and determine a joint time-domain signal of antenna channels according to the constraint relationship of the constellation point in each element and the convex optimization model;

the conversion unit is configured to perform a serial-to-parallel conversion on the joint time-domain signal to obtain a time-domain signal corresponding to each antenna channel.

2. The signal processing apparatus according to claim 1, wherein the constraint relationship comprises a constraint relationship of a real part and a constraint relationship of an imaginary part, and the judgment unit is configured to, in response to that the constellation point in the element of the first sub-signal is determined to be extended in the constellation diagram, determine the constraint relationship of the real part and the constraint relationship of the imaginary part of the constellation point in the element according to a position of the constellation point in the element in the constellation diagram, the constraint relationship of the real part and the constraint relationship of the imaginary part comprise a greater-than relationship, a smaller-than relationship, or an equal-to relationship.

3. The signal processing apparatus according to claim 2, wherein the judgment unit is configured to, in response to that the constellation point in the element is located in a first region in the constellation diagram, determine that each of the constraint relationship of the real part and the constraint relationship of the imaginary part of the constellation point in the element is the equal-to relationship;

in response to that the constellation point in the element is located in a second region in the constellation diagram, and a distance between the constellation point in the element and a real axis is smaller than a preset first threshold, determine that the constraint relationship of the imaginary part of the constellation point in the element is the equal-to relationship, in response to that the real part of the constellation point in the element is greater than zero, determine that the constraint relationship of the real part of the constellation point in the element is the greater-than relationship or the equal-to relationship, in response to that the real part of the constellation point in the element is smaller than zero, determine that the constraint relationship of the real part of the constellation point in the element is the smaller-than relationship or the equal-to relationship; in response to that the constellation point in the element is located in the second region in the constellation diagram, and a distance between the constellation point in the element and an imaginary axis is smaller than a preset second threshold, determine that the constraint relationship of the real part of the constellation point in the element is the equal-to relationship, in response to that the imaginary part of the constellation point in the element is greater than zero, determine that the constraint relationship of the imaginary part of the constellation point in the element is the greater-than relationship or the equal-to relationship, in response to that the imaginary part of the constellation point in the element is smaller than zero, determine that the constraint relationship of the imaginary part of the constellation point in the element is the smaller-than relationship or the equal-to relationship;

in response to that the constellation point in the element is located in a third region in the constellation diagram, and the imaginary part of the constellation point in the element is greater than zero, determine that the constraint relationship of the imaginary part of the constellation point in the element is the greater-than relationship or the equal-to relationship; in response to that the constellation point in the element is located in the third region in the constellation diagram, and the imaginary part of the constellation point in the element is smaller than zero, determine that the constraint relationship of the imaginary part of the constellation point in the element is the smaller-than relationship or the equal-to relationship; in response to that the constellation point in the element is located in the third region in the constellation diagram, and the real part of the constellation point in the element is greater than zero, determine that the constraint relationship of the real part of the constellation point in the element is the greater-than relationship or the equal-to relationship;

in response to that the constellation point in the element is located in the third region in the constellation diagram, and the real part of the constellation point in the element is smaller than zero, determine that the constraint relationship of the real part of the constellation point in the element is the smaller-than relationship or the equal-to relationship, wherein a distance between the first region and an origin is smaller than a distance between the second region and the origin, the distance between the second region and the origin is smaller than a distance between the third region and the origin.

4. The signal processing apparatus according to claim 2, wherein the judgment unit is further configured to, in response to that the constellation point in the element of the first sub-signal is determined to be not extended in the constellation diagram, determine that each of the constraint relationship of the real part and the constraint relationship of the imaginary part of the constellation point in the element is the equal-to relationship.

5. The signal processing apparatus according to claim 1, wherein the processing unit is configured to, in response to that the constellation point in the element of the first sub-signal is determined to be not extended in the constellation diagram, transform the convex optimization model by using a split Bregman algorithm and the constraint relationship of the constellation point in each element, and determine the joint time-domain signal of the antenna channels according to the transformed convex optimization model.

6. The signal processing apparatus according to claim 5, wherein the processing unit is configured to generate an initial model according to the convex optimization model and the constraint relationship of the constellation point in each element; transform the initial model into a first model with a constraint relationship; transform the first model into a second model without the constraint relationship; split the second model into a first sub-model according to the split Bregman algorithm, and optimize the first sub-model; and for the optimized first sub-model, iterate for a preset number of times, and determine the joint time-domain signal of the antenna channels.

7. The signal processing apparatus according to claim 1, wherein the convex optimization model is:

$$\min \|\hat{a}\|_\infty$$
$$\text{s.t.} \quad \operatorname{Re}(\hat{C}\hat{a}[i]) \gtreqless \operatorname{Re}(\hat{s}[i])$$
$$\operatorname{Im}(\hat{C}\hat{a}[i]) \gtreqless \operatorname{Im}(\hat{s}[i])$$

i=(1,2, ..., K*N), K is a number of single-antenna users, N is a number of the subcarriers; $\hat{C}$ is the joint matrix, $\hat{a}$ is the joint time-domain signal, and $\hat{s}$ is the serial QAM signal;

$$\gtreqless$$

is a generalized inequality, and represents one of >, <, =.

8. A signal processing method, comprising:
generating a joint matrix according to channel matrixes of subcarriers, and performing a parallel-to-serial conversion on QAM signals of the subcarriers to obtain a serial QAM signal comprising a first sub-signal corresponding to each subcarrier;
determining a constraint relationship of a constellation point in each element according to a determining result obtained by determining that whether the constellation point in each element of the first sub-signal is to be extended in a constellation diagram;
establishing a convex optimization model according to the joint matrix, the serial QAM signal and the determining result for the constellation point in each element;
determining a joint time-domain signal of antenna channels according to the constraint relationship of the constellation point in each element and the convex optimization model; and
performing a serial-to-parallel conversion on the joint time-domain signal to obtain a time-domain signal corresponding to each antenna channel.

9. The signal processing method of claim 8, wherein the constraint relationship comprises a constraint relationship of a real part and a constraint relationship of an imaginary part, and the determining a constraint relationship of a constellation point in each element according to a determining result obtained by determining that whether the constellation point in each element of the first sub-signal is to be extended in a constellation diagram comprises:
in response to that the constellation point in the element of the first sub-signal is to be extended in the constellation diagram, determining the constraint relationship of the real part and the constraint relationship of the imaginary part of the constellation point in the element according to a position of the constellation point in the element in the constellation diagram, the constraint relationship of the real part and the constraint relationship of the imaginary part comprise a greater-than relationship, a smaller-than relationship, or an equal-to relationship.

10. The signal processing method of claim 9, wherein the determining the constraint relationship of the real part and the constraint relationship of the imaginary part of the constellation point in the element according to a position of the constellation point in the element in the constellation diagram comprises:
in response to that the constellation point in the element is located in a first region in the constellation diagram, determining that each of the constraint relationship of the real part and the constraint relationship of the imaginary part of the constellation point in the element is the equal-to relationship;

in response to that the constellation point in the element is located in a second region in the constellation diagram, and a distance between the constellation point in the element and a real axis is smaller than a preset first threshold, determining that the constraint relationship of the imaginary part of the constellation point in the element is the equal-to relationship, in response to that the real part of the constellation point in the element is greater than zero, determining that the constraint relationship of the real part of the constellation point in the element is the greater-than relationship or the equal-to relationship, in response to that the real part of the constellation point in the element is smaller than zero, determining that the constraint relationship of the real part of the constellation point in the element is the smaller-than relationship or the equal-to relationship;

in response to that the constellation point in the element is located in the second region in the constellation diagram, and a distance between the constellation point in the element and an imaginary axis is smaller than a preset second threshold, determining that the constraint relationship of the real part of the constellation point in the element is the equal-to relationship, in response to that the imaginary part of the constellation point in the element is greater than zero, determining that the constraint relationship of the imaginary part of the constellation point in the element is the greater-than relationship or the equal-to relationship, in response to that the imaginary part of the constellation point in the element is smaller than zero, determining that the constraint relationship of the imaginary part of the constellation point in the element is the smaller-than relationship or the equal-to relationship; and in response to that the constellation point in the element is located in a third region in the constellation diagram, and the imaginary part of the constellation point in the element is greater than zero, determining that the constraint relationship of the imaginary part of the constellation point in the element is the greater-than relationship or the equal-to relationship; in response to that the constellation point in the element is located in the third region in the constellation diagram, and the imaginary part of the constellation point in the element is smaller than zero, determining that the constraint relationship of the imaginary part of the constellation point in the element is the smaller-than relationship or the equal-to relationship; in response to that the constellation point in the element is located in the third region in the constellation diagram, and the real part of the constellation point in the element is greater than zero, determining that the constraint relationship of the real part of the constellation point in the element is the greater-than relationship or the equal-to relationship; in response to that the constellation point in the element is located in the third region in the constellation diagram, and the real part of the constellation point in the element is smaller than zero, determining that the constraint relationship of the real part of the constellation point in the element is the smaller-than relationship or the equal-to relationship, wherein a distance between the first region and an origin is smaller than a distance between the second region and the origin, the distance between the second region and the origin is smaller than a distance between the third region and the origin.

11. The signal processing method of claim 9, wherein the determining a constraint relationship of a constellation point in each element according to a determining result obtained by determining that whether the constellation point in each element of the first sub-signal is to be extended in a constellation diagram further comprises:

in response to that the constellation point in the element of the first sub-signal is not to be extended in the constellation diagram, determining that each of the constraint relationship of the real part and the constraint relationship of the imaginary part of the constellation point in the element is the equal-to relationship.

12. The signal processing method of claim 8, wherein the determining a joint time-domain signal of antenna channels according to the constraint relationship of the constellation point in each element and the convex optimization model comprises:

in response to that the constellation point in the element of the first sub-signal is not to be extended in the constellation diagram, transforming the convex optimization model by using a split Bregman algorithm and the constraint relationship of the constellation point in each element, and determining the joint time-domain signal of the antenna channels according to the transformed convex optimization model.

13. The signal processing method of claim 12, wherein the transforming the convex optimization model by using a split Bregman algorithm and the constraint relationship of the constellation point in each element, and determining the joint time-domain signal of the antenna channels according to the transformed convex optimization model comprises:

generating an initial model according to the convex optimization model and the constraint relationship of the constellation point in each element;

transforming the initial model into a first model with a constraint relationship;

transforming the first model into a second model without the constraint relationship;

splitting the second model into a first sub-model according to the split Bregman algorithm, and optimizing the first sub-model; and for the optimized first sub-model, iterating for a preset number of times, and determining the joint time-domain signal of the antenna channels.

14. The signal processing method of claim 8, wherein the convex optimization model is:

$$\min \|\hat{a}\|_\infty$$
$$\text{s.t. } \operatorname{Re}(\hat{C}\hat{a}[i]) \gtreqless \operatorname{Re}(\hat{s}[i])$$
$$\operatorname{Im}(\hat{C}\hat{a}[i]) \gtreqless \operatorname{Im}(\hat{s}[i])$$

i=(1,2, . . . , >K*N), K is a number of single-antenna users, N is a number of the subcarriers; $\hat{C}$ is the joint matrix, $\hat{a}$ is the joint time-domain signal, and $\hat{s}$ is the serial QAM signal;

$$\gtreqless$$

is a generalized inequality, and represents one of >, <, =.

* * * * *